(12) United States Patent
Yuyama et al.

(10) Patent No.: US 7,731,473 B2
(45) Date of Patent: Jun. 8, 2010

(54) MEDICINE TRAY SUPPLY APPARATUS

(75) Inventors: Shoji Yuyama, Toyonaka (JP); Akitomi Kohama, Toyonaka (JP); Tatsuaki Kunimoto, Toyonaka (JP); Katsumasa Shirai, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 175 days.

(21) Appl. No.: 11/587,556
(22) PCT Filed: Apr. 27, 2005
(86) PCT No.: PCT/JP2005/008026

§ 371 (c)(1),
(2), (4) Date: May 11, 2007

(87) PCT Pub. No.: WO2005/105629

PCT Pub. Date: Nov. 10, 2005

(65) Prior Publication Data

US 2008/0159843 A1 Jul. 3, 2008

(30) Foreign Application Priority Data

Apr. 30, 2004 (JP) ............................ 2004-136543

(51) Int. Cl.
*B65G 59/10* (2006.01)
*B65G 65/04* (2006.01)
*B65G 59/00* (2006.01)
*B65B 21/02* (2006.01)
*B65H 3/00* (2006.01)

(52) U.S. Cl. .............................. 414/795.6; 414/416.05; 414/797.5; 221/251

(58) Field of Classification Search ................. 221/251; 414/222.07, 222.09, 222.1, 222.11, 259, 414/354, 356–357, 365, 370, 404, 414, 416.04–416.05, 414/416.07, 788.2, 794.9, 795.2, 795.3, 795.6, 414/797.4–797.5, 797.8, 798, 798.4, 929, 414/331.11, 331.09, 331.06; 198/346.1, 198/347.1, 346.2

See application file for complete search history.

(56) References Cited

U.S. PATENT DOCUMENTS 3,690,435 A * 9/1972 King et al. ............... 198/463.3

(Continued)

FOREIGN PATENT DOCUMENTS

DE 1 478 857 1/1970

(Continued)

OTHER PUBLICATIONS

Chinese Office Action (with English translation) dated Jul. 17, 2009 in corresponding Chinese Patent Application No. 200580013874.
Chinese Office Action (in English language) issued Jan. 29, 2010 in corresponding Chinese Patent Application No. 200580013874.X.

*Primary Examiner*—Gregory W Adams
(74) *Attorney, Agent, or Firm*—Wenderoth, Lind & Ponack, L.L.P.

(57) ABSTRACT

A medicine tray storage member (100) capable of storing medicine trays (7) in a stacked condition includes: a tray support member (101) for supporting the medicine trays (7); a tray transport member (102) having a transport mechanism for transporting the medicine trays (7), the tray transport member constituting a part of the tray transport line (3); and a control portion for allowing the tray support member (101) to move down to put the stacked medicine trays (7) on the tray transport member (102), thereby allowing the tray support member (101) to support and move up the next medicine tray (7) positioned above the lowermost one, and allowing the tray transport member (102) to supply the medicine tray (7) situated at the lowermost position to the tray transport line (3). The tray transport member (102) includes cut out portions (11) receiving movable leg portions (125) of a carrier (123) on which the medicine trays (7) in a stacked state are loaded.

7 Claims, 22 Drawing Sheets

Tray transport direction

U.S. PATENT DOCUMENTS

| | | | | |
|---|---|---|---|---|
| 3,776,395 | A | * | 12/1973 | Lingg et al. ............... 414/788.8 |
| 3,934,736 | A | * | 1/1976 | Thomas ................... 414/790.7 |
| 3,977,542 | A | * | 8/1976 | Stolzer .................. 414/331.11 |
| 4,252,484 | A | * | 2/1981 | Benson et al. ........... 414/795.6 |
| 5,536,137 | A | * | 7/1996 | Jager ....................... 414/788.7 |
| 5,600,059 | A | * | 2/1997 | Sondey .................... 73/116.02 |
| 5,882,174 | A | * | 3/1999 | Woerner et al. .......... 414/788.7 |
| 6,447,236 | B1 | * | 9/2002 | Grams et al. ................ 414/401 |
| 6,846,147 | B2 | * | 1/2005 | Maser et al. ........... 414/331.09 |

FOREIGN PATENT DOCUMENTS

| | | | | |
|---|---|---|---|---|
| GB | 2353776 | A | * | 3/2001 |
| JP | 59158739 | A | * | 9/1984 |
| JP | 4-159924 | | | 6/1992 |
| JP | 6-137397 | | | 5/1994 |
| JP | 6-183568 | | | 7/1994 |

* cited by examiner

Tray transport direction →

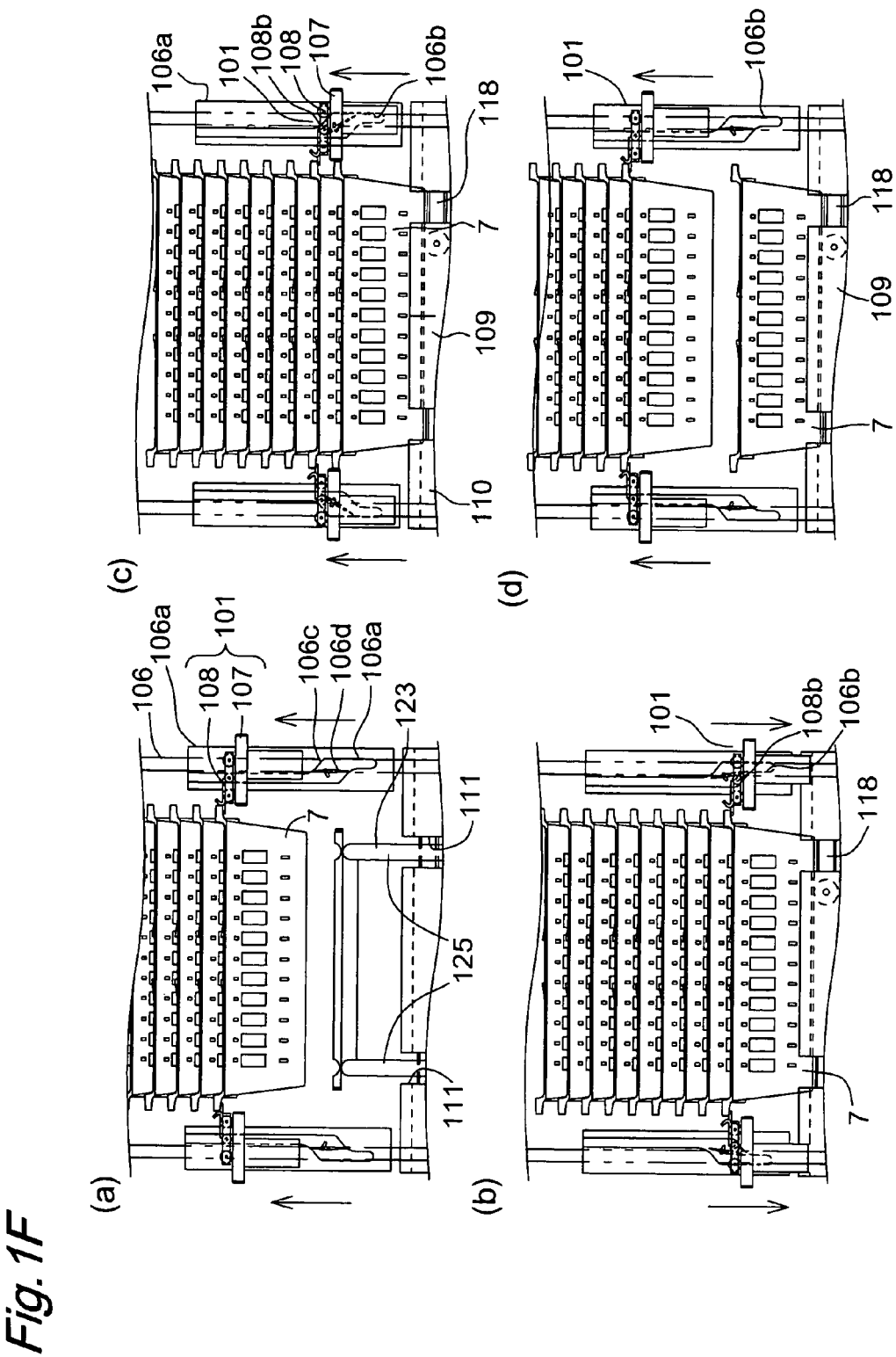

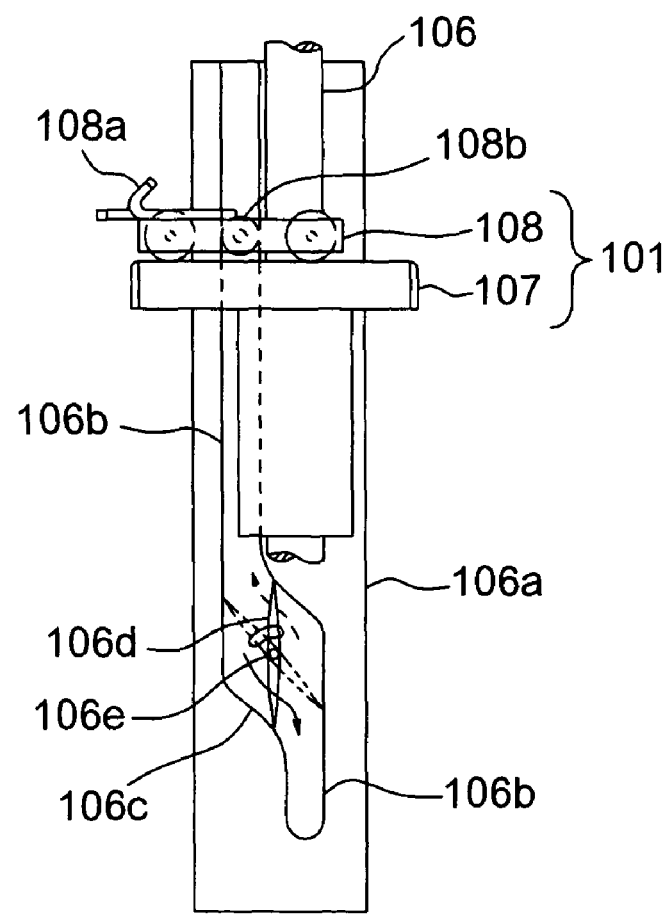

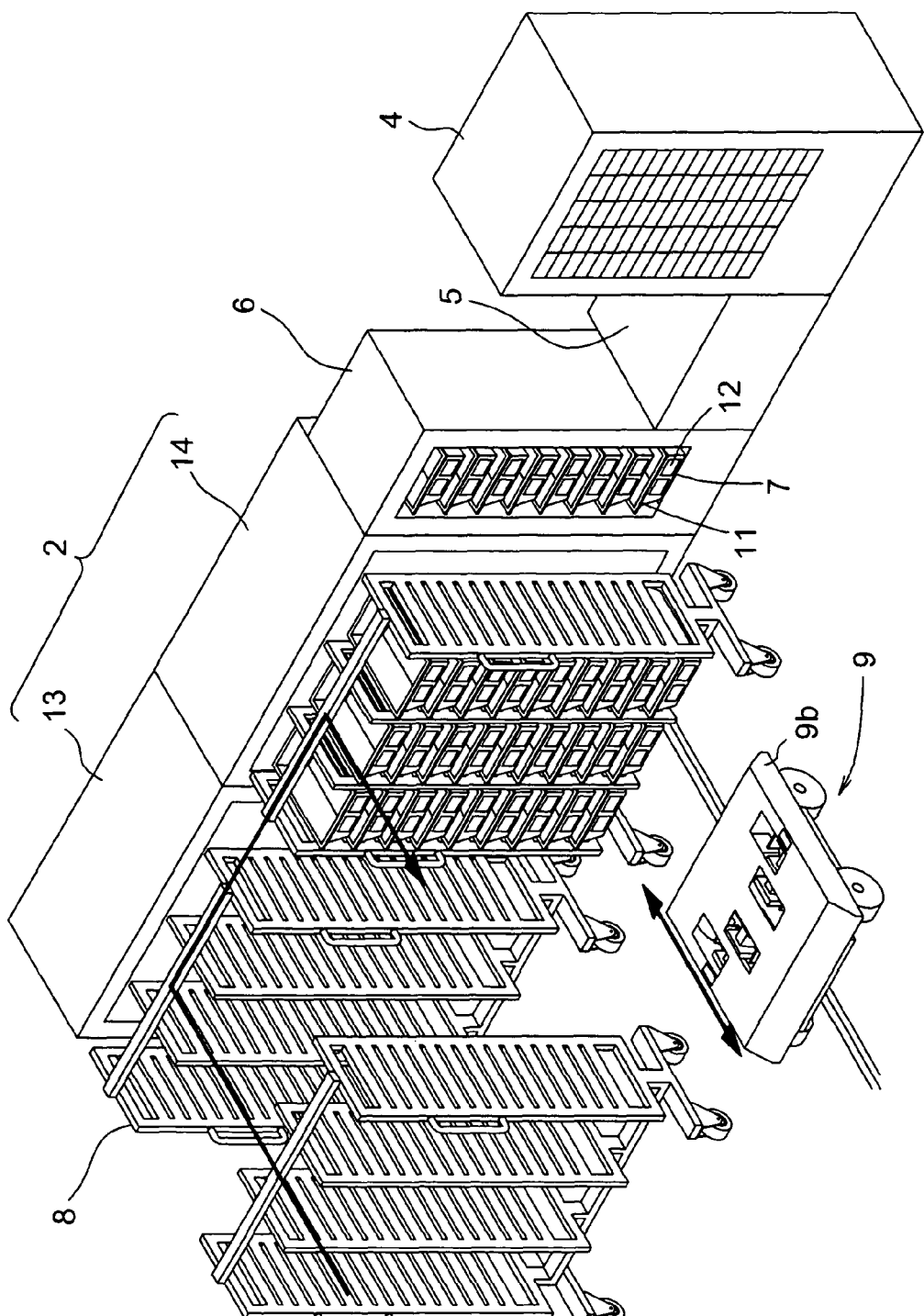

Fig. 13
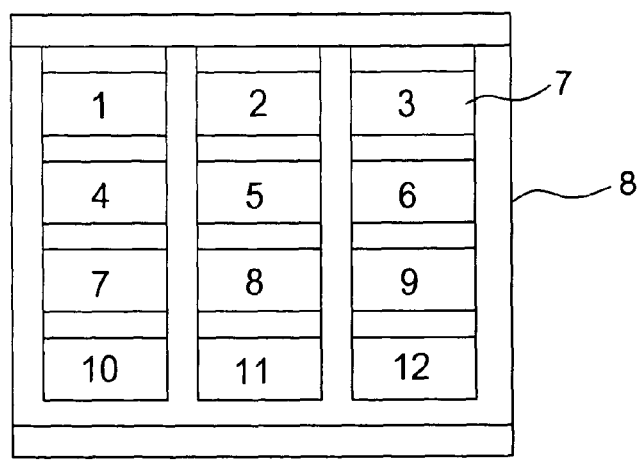
(a)
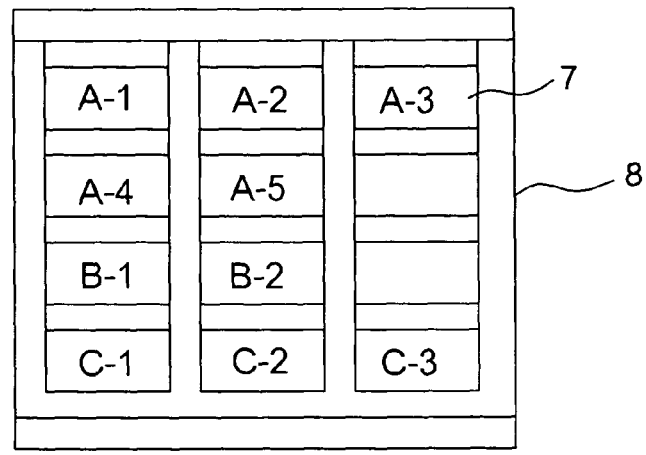
(b)
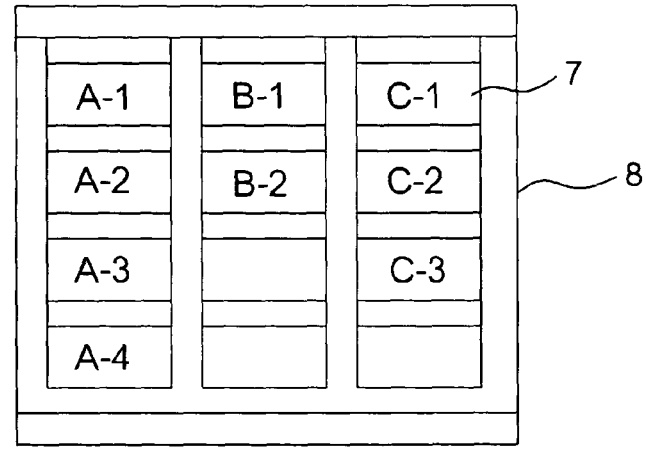
(c)

MEDICINE TRAY SUPPLY APPARATUS

BACKGROUND OF THE INVENTION

1. Technical Field

The present invention relates to a medicine tray supply system for automatically supplying trays containing medicine to a tray transport line.

2. Description of the Related Art

Conventionally, an automatic supply apparatus for a packing container in which a lowermost one of stacked containers is sequentially dispensed and supplied has been known (see for example JP A 6-183568).

JP 6-183568 describes automatic dispensing of packing containers but does not disclose a construction for setting the containers themselves. The medicine trays used for containing and transporting medicine are relatively heavy and very difficult to set in a stacked state.

SUMMARY OF THE INVENTION

It is an object of the present invention to provide a medicine tray supply apparatus with which the medicine trays can easily be set in a stacked state.

As means to solve the problems in the known devices, the present invention provides a medicine tray supply apparatus for supplying medicine trays to a tray transport line, comprising:

a medicine tray storage member capable of storing the medicine tray in a stacked condition;

the medicine tray storage member including:

a tray support member for supporting the medicine trays;

a tray transport member having a transport mechanism for transporting the medicine tray, the tray transport member constituting a part of the tray transport line; and a control portion for allowing the tray support member to move down to put the medicine trays of stacked state on the tray transport member, allowing the tray support member to support and move up the next medicine tray positioned above the lowermost one, and allowing the tray transport member to supply the medicine tray situated at the lowermost position to the tray transport line, wherein the tray transport member includes cut out portions in which leg portions of a carrier on which the medicine trays in a stacked state are loaded are movable.

According to this construction, the medicine trays can be set in the medicine tray storage member in a stacked state on the carrier along with the carrier. That is to say, the leg portions of the carrier do not interfere with the tray transport member due to the cut out portions and the medicine tray transport function by the tray transport member is never impaired.

It is preferable that the tray transport member is provided with a carrier pushing member for moving the carrier from the state positioned in the medicine tray storage member to the outside of the medicine tray storage member. Thus, it is possible to easily take out only the carrier from the medicine tray storage member.

It is preferable that the control unit allows the carrier pushing member to maintain a state that the carrier is prevented from entering the medicine tray storage member. Thus, the carrier is never set by mistake into the medicine tray storage member during the transportation of the medicine tray by the tray transport member, thereby providing a safety feature.

It is also preferable that the medicine tray storage member comprises a plurality of medicine tray storage members juxtaposed to each other, each of which is provided with a medicine detection portion for detecting whether or not the medicine tray conveyed by the tray transport member is present. The control portion allows the medicine tray storage member positioned at the upstream side among the plurality of medicine tray storage members to supply the medicine trays and if it is decided that the medicine tray becomes depleted based on the detection signal of the portion, the control portion allows the next medicine tray storage member positioned at the downstream side of the medicine tray storage member positioned at the upstream side to commence supplying the medicine trays.

According to this construction, the medicine tray can be supplied from the next medicine tray storage member during the operation of replenishing the medicine trays in the medicine tray storage member in which the supply of medicine trays has been depleted. Thus, the replenishing work of the medicine tray can be conducted without disturbing the supplying work of the medicine tray, thereby enhancing the working efficiency considerably.

According to the present invention, as the cut portions are formed in the tray transport member, it is possible to directly set the medicine tray on the carrier in a stacked state, enabling the medicine trays to efficiently be set.

BRIEF DESCRIPTION OF THE DRAWINGS

FIG. 1F are a series of views showing a tray supply process by a tray support member;

FIG. 1G is an enlarged view of a tray support member and a guide plate;

FIG. 2 is a perspective view showing a tray discharge unit of FIG. 1A;

FIGS. 13($a$), ($b$), ($c$) are front views showing examples of the trays stored in the cart;

EXPLANATION OF THE REFERENCE NUMERALS

Figure 1A:
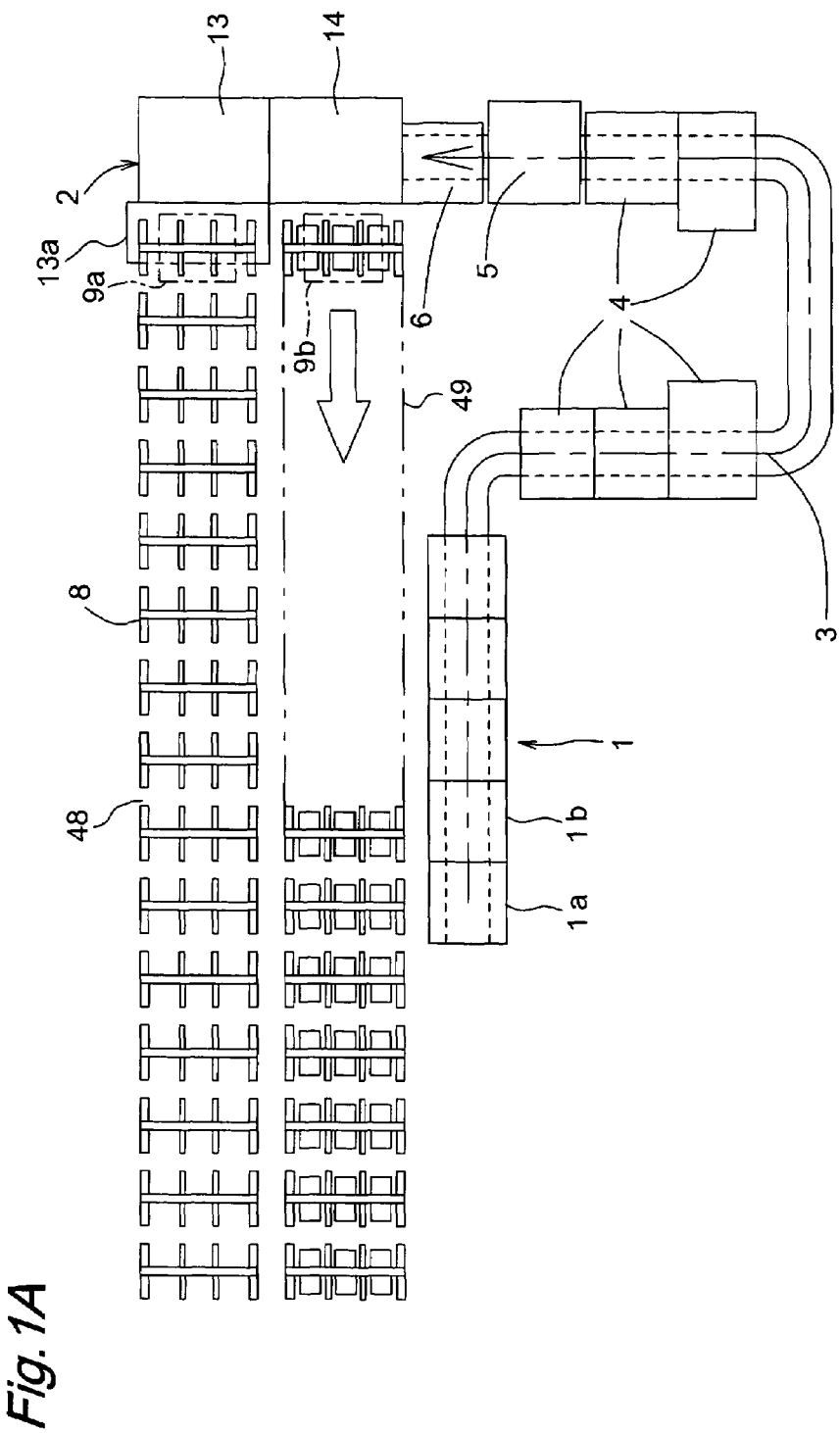
FIG. 1A is a general view showing an outline of medicine supply system according to an embodiment of the present invention.

1 Supply lifter (medicine tray supply apparatus)
2 Tray discharge unit
3 Tray transport line
4 Medicine dispensing unit
5 card rewriting unit
6 Stack lifter
7 Tray
8 Cart
9 Cart transport unit
10 Control unit
11 Flange portion
12 Identification card
13 Cart standby portion
14 Tray supply portion
15 Cart shift member
16 First optical communication portion
17 First guide member
18 Elevation motor
19 Gear
20 Guide piece
21 Tray shift unit
22 Vertical rail
23 Horizontal rail
24 Tray holding member
25 Arm portion
26 Pushing portion
27 Second optical communication portion
28 Electromagnet portion
29 Second guide member
30 Guide roller
31 Guide cover
32 Driving belt
33 Slider
34 Pusher
35 Pulley
36 Gear
37 Shift motor
38 Support panel
39 Leg portion
40 Upper connection portion
41 Lower connection portion
42 Grip
43 Support portion
44 Caster
45 Guide groove
46 Storage shelf
47 Reflection plate
48 Cart supply line
49 Cart discharge line
50 Wheel
51 Frame
52 Drive motor
53 Detection member
54 Control substrate
55 Grip member
56 Bearing member
57 Drive transmission belt
58 Cart detection sensor
59 Position deviation detection sensor
60 Detection sensor
61 Third optical communication portion
62 Pulse driver
63 Signal converter
64 Grip arm
65 Drive shaft
66 Driven shaft
67 Drive gear
68 Driven gear
69 Support table
70 Sensor dog
71 Position detection sensor
72 Current collecting arm
73 Slit
74 Power supply unit
75 Guide rail
76 Trolley
77 Cover
78 Server
79 Input unit
100 Cabinet
101 Tray support member
102 Tray transport member
103 Carrier pushing member
104 First switch
105 Second switch
106 Rail
107 Lifting table
108 support piece
109 First conveyor portion
110 Second conveyor portion
111 Cut out portion
112 rotation shaft
113 Conveyor roller
114 Pulley
115 Belt
116 First motor
117 Arm
118 press portion
119 Drive roller
120 Belt
121 First tray detection sensor
122 Second tray detection sensor
123 Carrier
124 Support plate
125 Leg portion
126 Wheel

DETAILED DESCRIPTION OF THE PREFERRED EMBODIMENTS

Hereinafter, embodiments of the present invention will be described with reference to the accompanying drawings.

Figure 11:
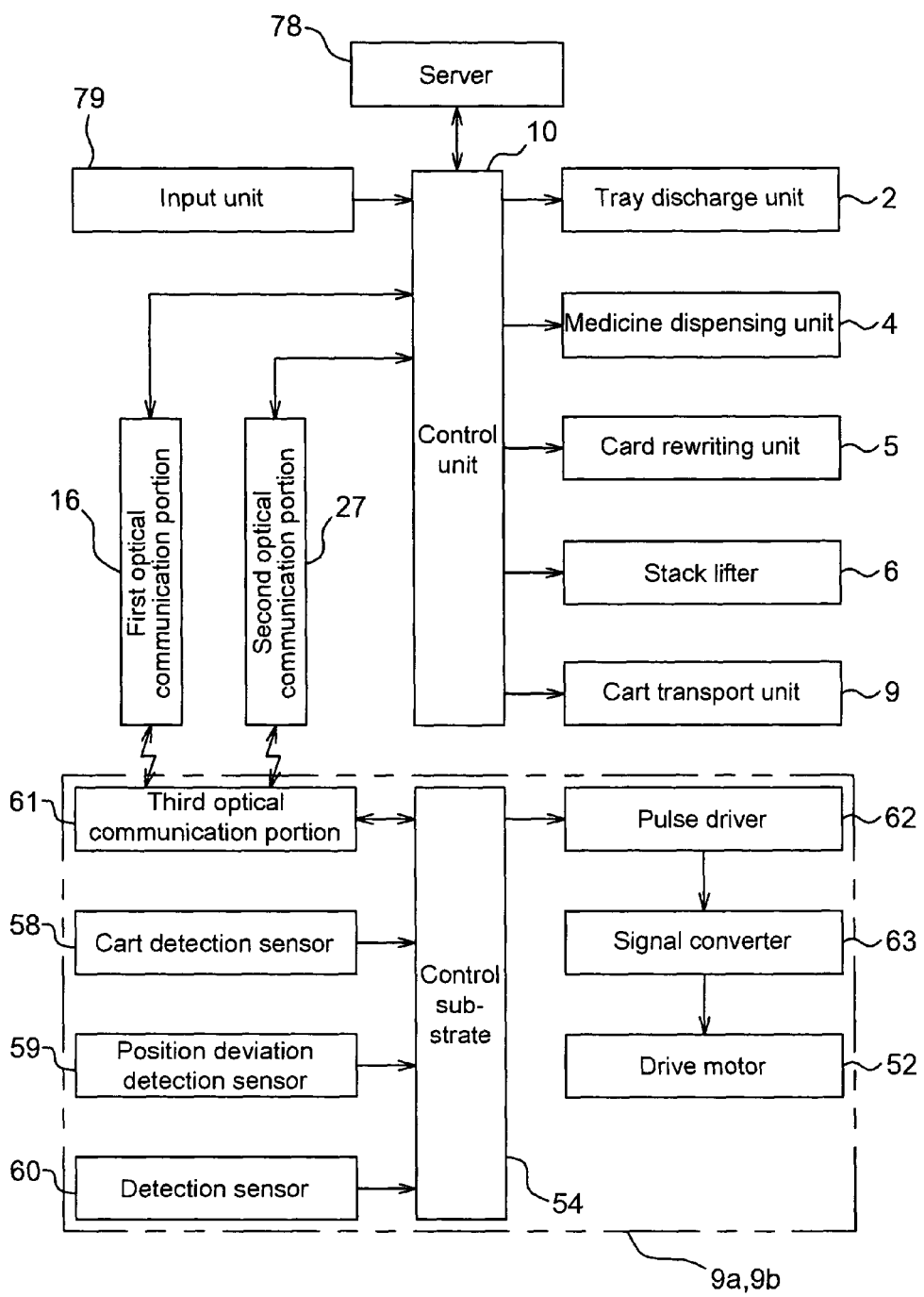
FIG. 11 is a block diagram showing a control unit of the medicine supply system according to the present invention.

FIGS. 1A-1H show a medicine supply system according to an embodiment of the present invention. In the medicine supply system, a plurality of medicine dispensing units 4, card rewriting unit 5 and a stack lifter 6 are disposed along a tray transport line 3 connecting a supply lifter and a tray discharge unit 2. As shown in FIG. 2, there is provided a cart transport unit 9 which transports empty carts 8 to the tray discharge unit 2 and transports the carts 8 with stored trays 7. As shown in FIG. 11, these members are controlled by a control unit 10.

The supply lifter 1 stores a plurality of trays 7 in a stacked state and sequentially discharges the plurality of trays one-by-one to the tray transport line 3. The supply lifter 1, as shown in FIG. 1B, has a cabinet (medicine tray storage member) 100 of box-like shape with the front side open. In the cabinet 100, the supply lifter 1 is provided with a tray support member 101 for supporting the stacked trays 7, a tray transport member 102 constituting apart of the tray transport line 3 and a carrier pushing member 103 capable of pushing a carrier 123. In this embodiment, the supply lifter 1 comprises five units positioned in series along the tray transport line 3.

On one side of the front panel of the cabinet 100, first and second switches 104, 105 with LEDs are attached. The first switch 104 flashes when pushed by the operator in order to replenish the trays 7 in the cabinet 100. The second switch 105 lights up when the carrier 123 with the trays loaded is entered in the cabinet 100 and positioned in place, allowing a pushing operation of the carrier 123.

Figure 1B:
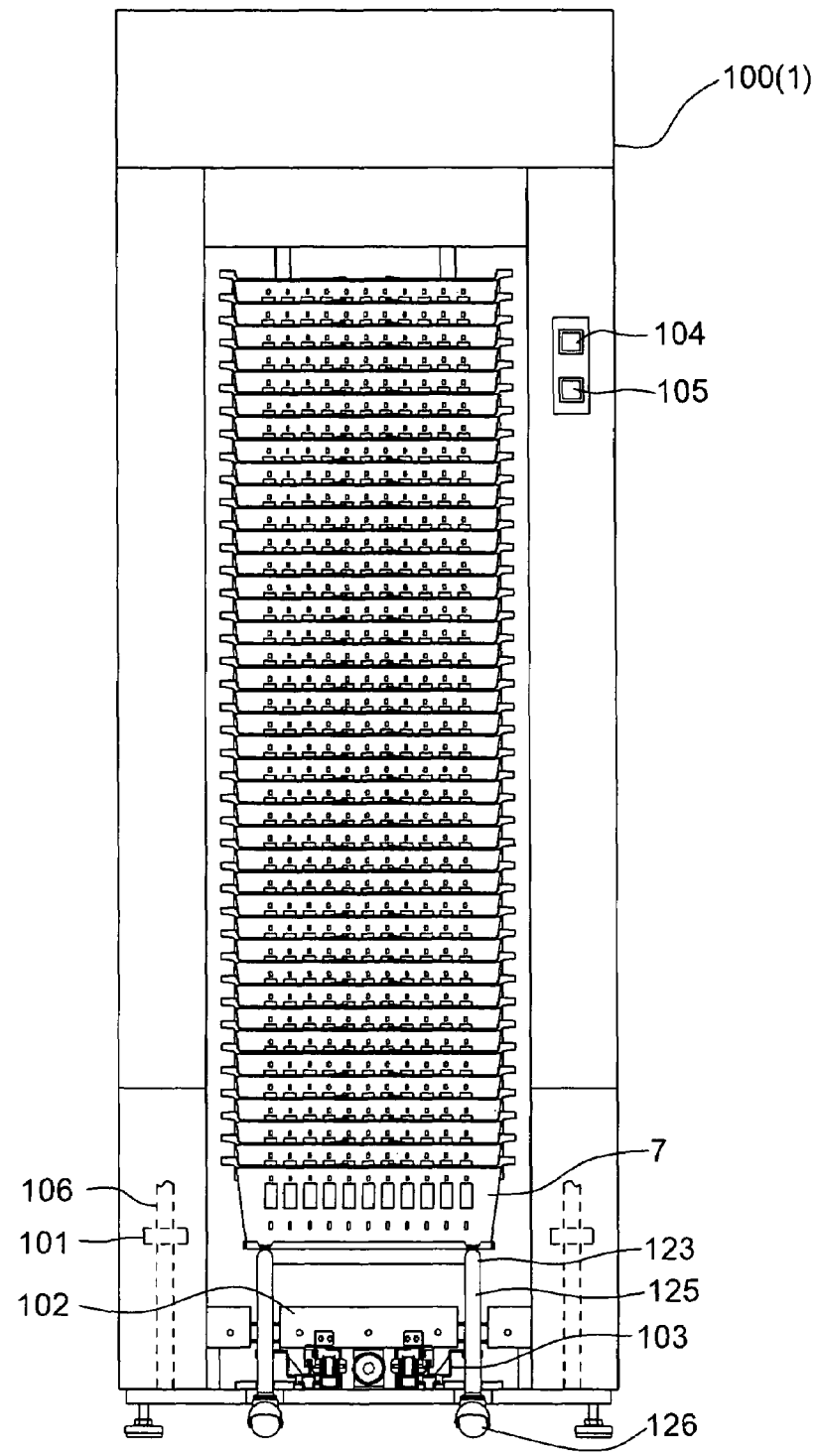
FIG. 1B is a front view showing a supply lifter of FIG. 1.
Figure 1C:
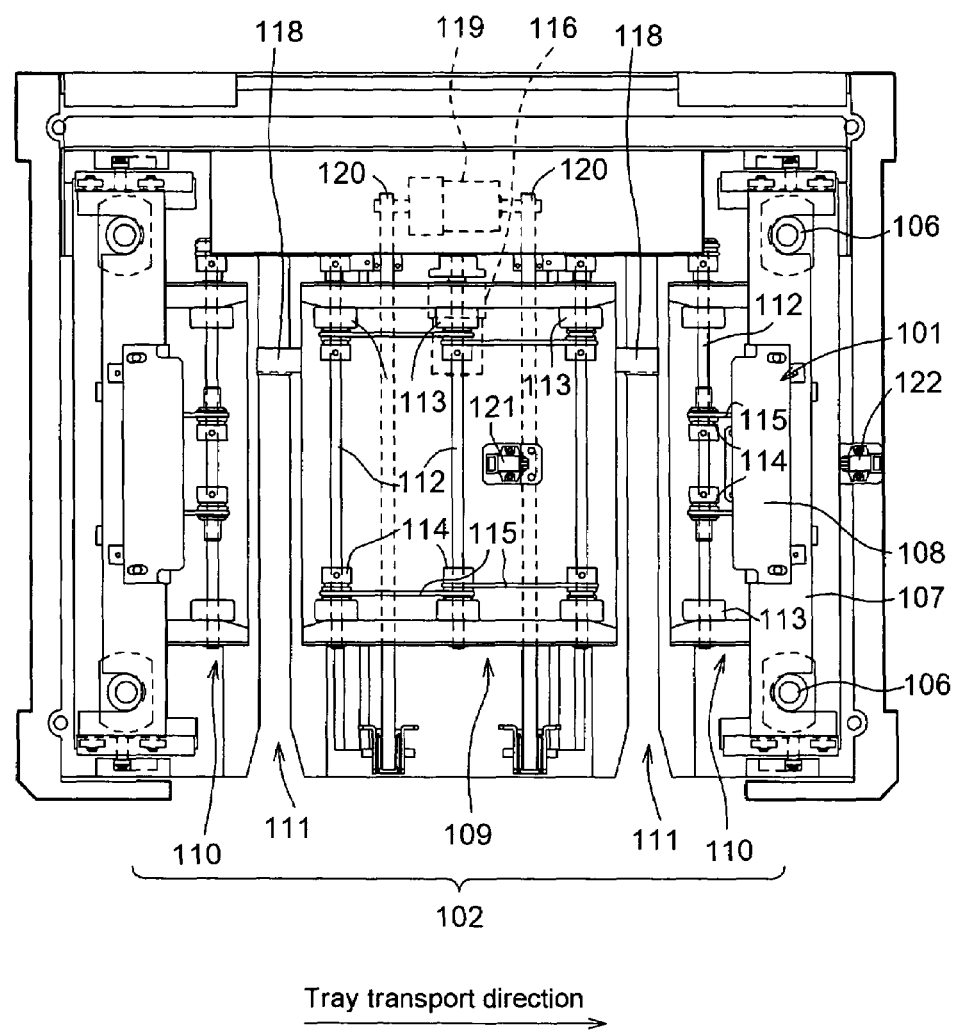
FIG. 1C is a plan view showing a bottom surface portion of FIG. 1B.
Figure 1D:
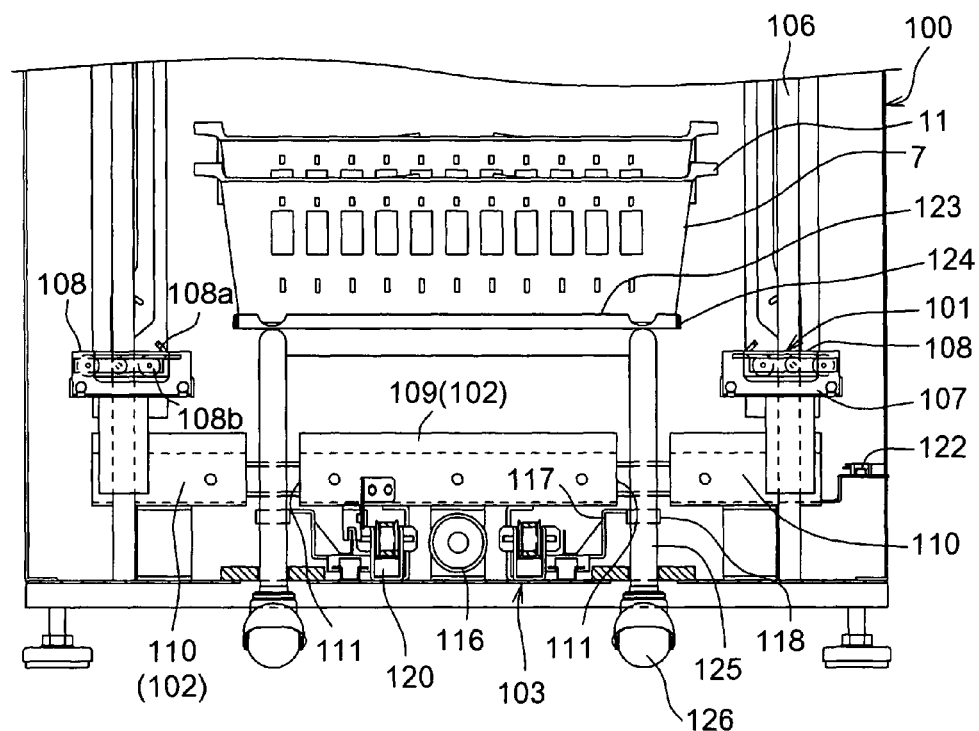
FIG. 1D is a front view of the bottom portion of FIG. 1C.

The tray support member 101, as shown in FIG. 1D, is comprised of lifting tables 107 mounted on rails 106, which are provided on opposite inside surfaces of the cabinet 100 so as to extend vertically, so that the lifting tables 107 are capable of ascending and descending along the rails 106. The tray support member 101 is also comprised of support pieces 108 which are slidably provided on the lifting tables 107. Each of the support pieces 108 has a part 108a for supporting both the side edge and the lower surface of the flange 11 of the tray 7. The part 108a is formed by cutting and bending upward the end of the support piece 108. On the bottom surface of the support piece 108, a plurality of rollers 108b is provided so that the support piece 108 can moved back and forth by a drive unit (not shown) between a support position where the support piece 108 approaches the tray to support the flange 11 of the tray 7 and a retreat position where the support piece 108 is separate from the tray 7. As shown in FIG. 1F(c), when the lifting tables 107 ascend and descend, the support piece 108 moves horizontally by operation of guide plates 106a provided on the lower end portions of the rails 106. That is to say, each of the guide plates 106a is formed with a guide groove 106b. The guide groove 106b is comprised of a slope portion 106c having a predetermined width and slanting to the outside toward the bottom and a path restriction plate 106d. The path restriction plate 106d, as shown in FIG. 1G, is provided pivotably around a pin 106e positioned at the center so as to move between a first position parallel to the guide groove 106b and a second position parallel to the slope portion 106c. The path restriction plate 106d is biased toward the first position by a spring (not shown). Therefore, the edge of the guide groove 106b on which rolls the roller 108b positioned at the center of the support piece 108 is different between ascending time and descending time. At the descending time, as shown in a solid line of FIG. 1G, the roller 108b rolls on the lower side edge portion of the slope portion 106c to move the support piece 108 to the outside. At the ascending time, as shown in a broken line of FIG. 1G, the roller 108b rolls on the upper side edge portion of the slope portion 106c to move the support piece 108 to the inside.

The tray transport member 102, as shown in FIG. 1C, is comprised of a first transport portion 109 positioned at the center and second transport portions 110 positioned on both sides of the first transport portion 109, i.e., on upstream and downstream sides of the tray transport line. There is a cut out portion 111 between the transport portions 109, 110. The first transport portion 109 is comprised of three rotation shafts 112 juxtaposed in predetermined intervals, conveyor rollers 113 and pulleys 114 fixed on the rotation shafts 112, and belts 115 engaged between the pulleys 14 of the rotation shafts 112 adjacent to each other. A drive power of first motor 116 is transmitted to the central rotation shaft 112 via gears (not shown) to rotatingly drive the conveyor rollers 113 via the belts 115 and the pulleys 114 so that the tray 7 disposed on the upstream side can be transported to the downstream side. The second transport portions 110 are comprised of two rotation shafts 112 disposed in predetermined intervals, conveyor rollers 113 fixed on both ends of each rotation shaft 112, pulleys 114 fixed on the center portion of each of the rotation shafts 112, and belts engaged between the pulleys 114 of the rotation shafts 112. A drive power of a motor (not shown) is transmitted to one of the rotation shafts 112 to rotate the conveyor rollers 113 via the belts 115 and the pulleys 114 so that the tray 7 can be transported.

Figure 1E:
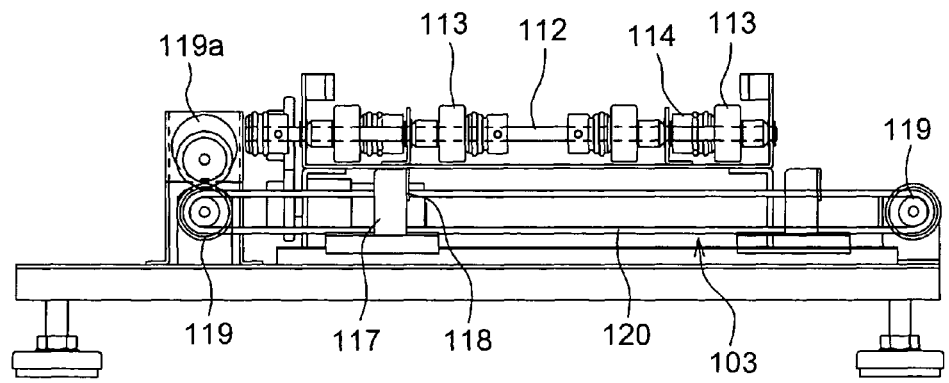
FIG. 1E is a side view showing a carrier pushing member of FIG. 1D.

Each of the carrier pushing members 103, as shown in FIGS. 1D and 1E, is comprised of a bent arm 117 and a press portion 118 of resilient material attached on one end of the arm 117. The carrier pushing members 103 are disposed on the upstream side and the downstream side of the tray transport line 3, respectively. In the front and rear of the cabinet 100 are disposed drive rollers 119 with which a belt 120 is engaged. The other end of the arm 117 is fixed on the belt 120. One of the drive rollers 119 is driven by a second motor 119a to rotate, allowing the arm 117 and the press portion 118 to move back and forth via the belt 120. The press portions 118 move back and forth beneath the cut out portions 111 of the tray transport member 102 to push the leg portions 125 of carrier 123 which will be described herein after and discharge the carrier 123 from the cut out portions 111. That is to say, the carrier 123 can be moved outside the cabinet 100.

At the center portion of the first transport portion 109 and the lateral side of the cabinet 100, a first tray detection sensor 121 and a second tray detection sensor 122 are disposed respectively. The first tray detection sensor 121 detects whether or not the tray 7 is positioned at the first conveyor portion 109 and is used to decide whether or not there is a shortage of the trays 7 at the supply lifter 1 and whether or not the tray 7 has come from the upstream side. The second tray detection sensor 122 is disposed on the boundary portion of the adjacent supply lifters 1 to detect a carrying state of the tray 7 by the tray transport member 102.

The carrier 123 is comprised of a support plate 124 of rectangular shape and leg portions 125 extending downward from the four corners of the support plate 124. Wheels 126 are provided on the lower ends of the leg portions 125. The wheels 126 are rotatable on the plane and are pivotable to permit change of the moving direction. The wheels 126 are capable of entering the cut out portions 111.

Figure 3:
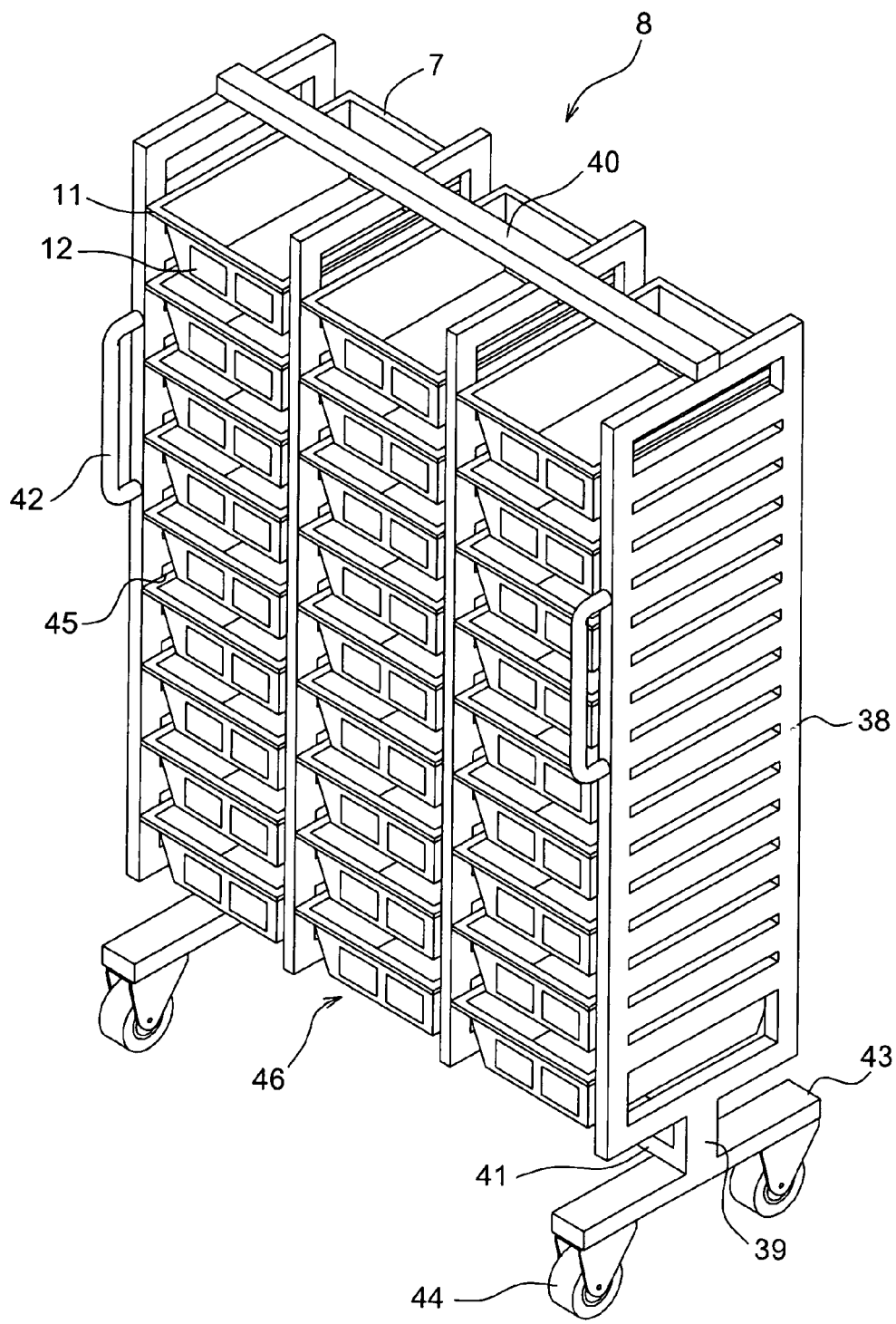
FIG. 3 is a perspective view of a cart with the trays stored.
Figure 4:
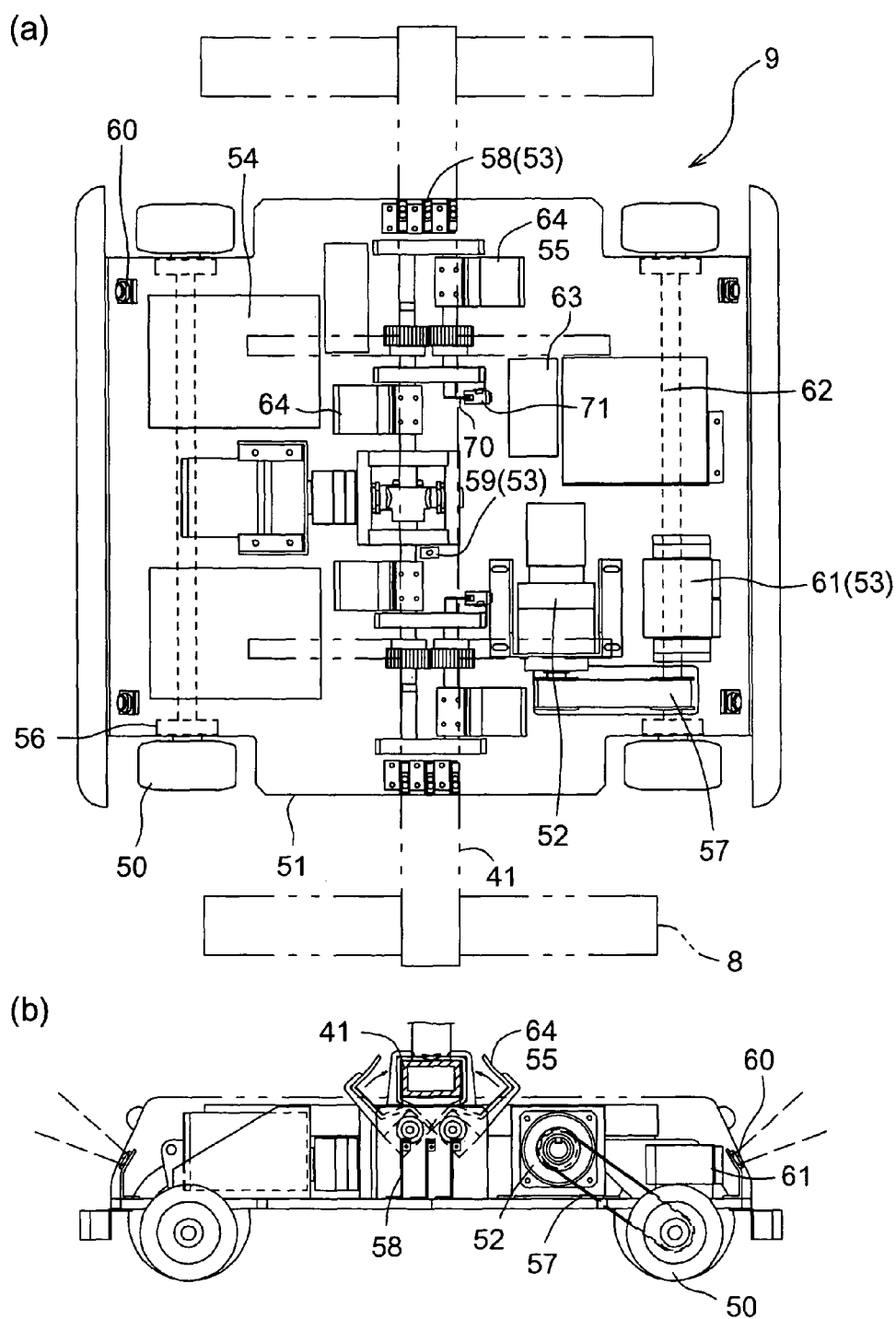
FIG. 4($a$) is a plan view showing an internal construction of a tray transport unit and FIG. 4($b$) is a front view of FIG. 4($a$)

Each tray 7, as shown in FIG. 3, has a box shape with an open upper surface provided with a flange portion 11. On the side surface of the tray 7, an identification card 12 can be attached and detached. As the identification card 12, a Lueco type or a thermochromic type of rewrite card, which is rewritable by heating to a predetermined temperature, is employed. Patient information can be written on the identification card 12.

Figure 7:
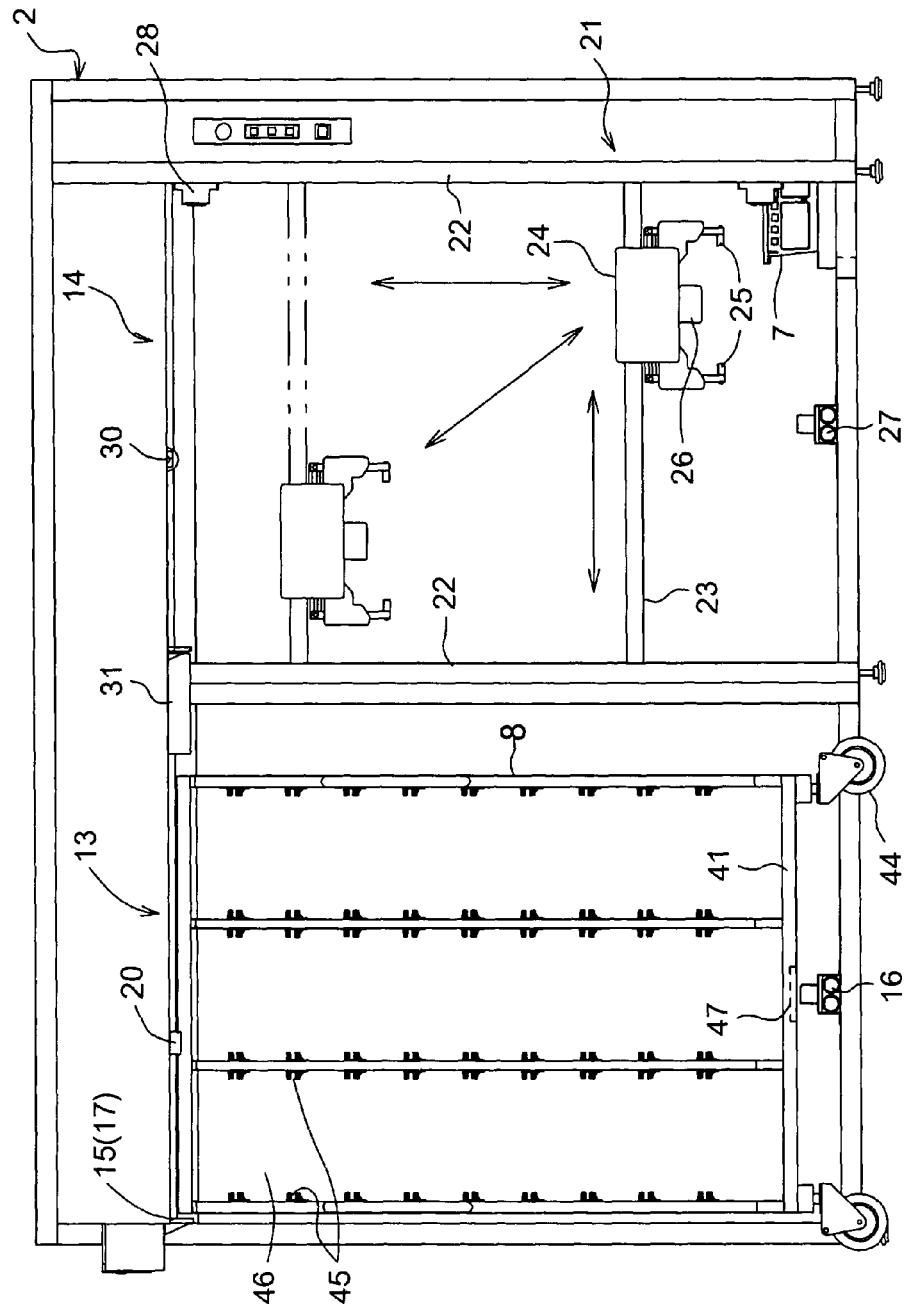
FIG. 7 is a front view of a tray discharge unit.

The tray discharge unit 2, as shown in FIGS. 2 and 7, comprises a cart standby portion 13 and a tray supply portion 14. On the upper part of the tray discharge unit 2 is provided a cart shift member 15. The tray discharge unit 2 sequentially stores the trays 7 with the medicine contained in the empty cart 8.

Figure 9:
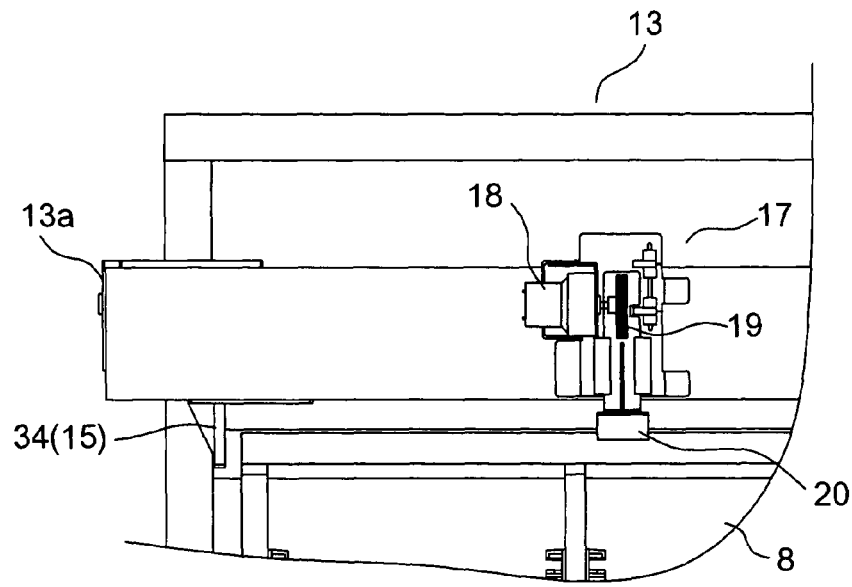
FIG. 9 is an enlarged view showing a part close to a first guide member of FIG. 7.

The cart standby portion 13, as shown in FIG. 7, comprises plate-like members assembled in a rectangular frame and ensures a space for putting the cart 8 on standby at a position along the tray discharge unit 13 in order to quickly adequately shift the cart 8 to next tray supply unit 14. At the middle portion of the lower plate of the cart standby portion 13, a first optical communication portion 16 is provided. The first optical communication portion 16 conducts transmission and receipt of data with a third optical communication portion 61 provided in the cart transport unit 9 which will be described herein after. As shown in FIG. 9, at the middle portion of an overhanging portion 13a of the cart standby portion 13 is provided a first guide member 17. The guide member 17 moves a guide piece 20 up and down via a gear 19 by driving an elevation motor. When moving up, the guide piece 20 enables the cart 8 to enter into the cart standby portion 13 from the cart supply line 48. When moving down, the guide piece 20 guides the cart 8 which moves from the cart standby portion 13 to the tray supply portion 14 and prevents the next empty cart 8 from entering.

The tray supply portion 14, as shown in FIG. 7, has a shape of a rectangular frame and is provided with a tray transfer apparatus 21. The tray transfer apparatus 21 has a construction in which a horizontal rail 23 is provided slidably in a vertical direction on vertical rails 22 attached on the plate-like members on both sides of the tray supply portion and a tray holding member 24 is movably provided in a horizontal direction on the horizontal rail 23. The tray holding member 24 comprises arm portions 25 for holding the flange portions 11 of the tray 7 and a push portion 26 for pushing the tray 7 held by the arm portions 25 forward, i.e., toward the cart 8. The tray holding member 24 can move in both the X (horizontal) direction and the Y (vertical) direction to store the tray 7 in an appropriate storage shelf 46.

Figure 10:
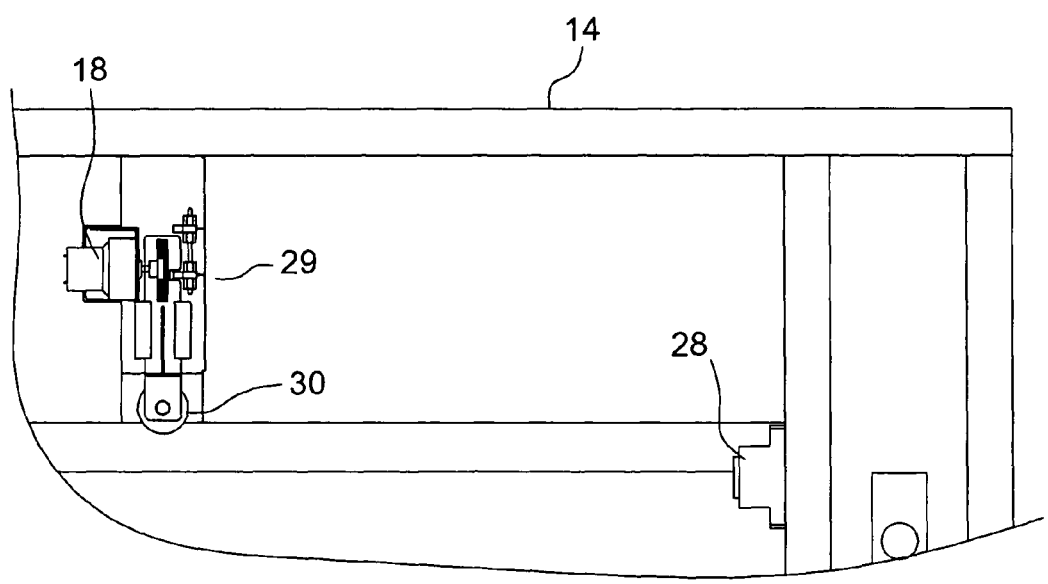
FIG. 10 is an enlarged view showing a part close to a second guide member of FIG. 7.

The tray supply portion 14 is provided with a second optical communication portion 27 which conducts transmission and reception of data with respect to a third optical communication portion 61 provided in the cart transfer apparatus 9 that will be described herein after. On the upper portion of the side plate, an electric magnet portion 28 is provided. The electric magnet portion 28 is energized upon the empty cart 8 is transferred by the cart transfer member 15 so that the cart 8 is attracted and positioned. This prevents displacement of the position of the cart 8 when the cart 8 is stored in the cart 8. On the middle portion of the upper plate of the tray supply portion 14, as shown in FIG. 10, is provided a second guide member 29 having the same construction as the first guide member 17. In the second guide member 29, a guide roller 30 is provided instead of the guide piece 20. The guide roller 30 descends to guide the cart 8 moving from the cart standby portion 13 to the tray supply portion 14 and ascends to enable the cart 8 to move from the tray supply portion 14 to the cart discharge line 49.

As shown in FIG. 7, a guide cover 31 is provided on the upper portion of the boundary between the cart standby portion 13 and the tray supply portion 14. The guide cover 31 has a substantially L-shaped of plate-like body extending from the horizontal direction to the vertically lower direction and prevents displacement of the position of the cart 8 when the cart 8 moves from the cart standby portion 13 to the tray supply portion 14.

Figure 8:
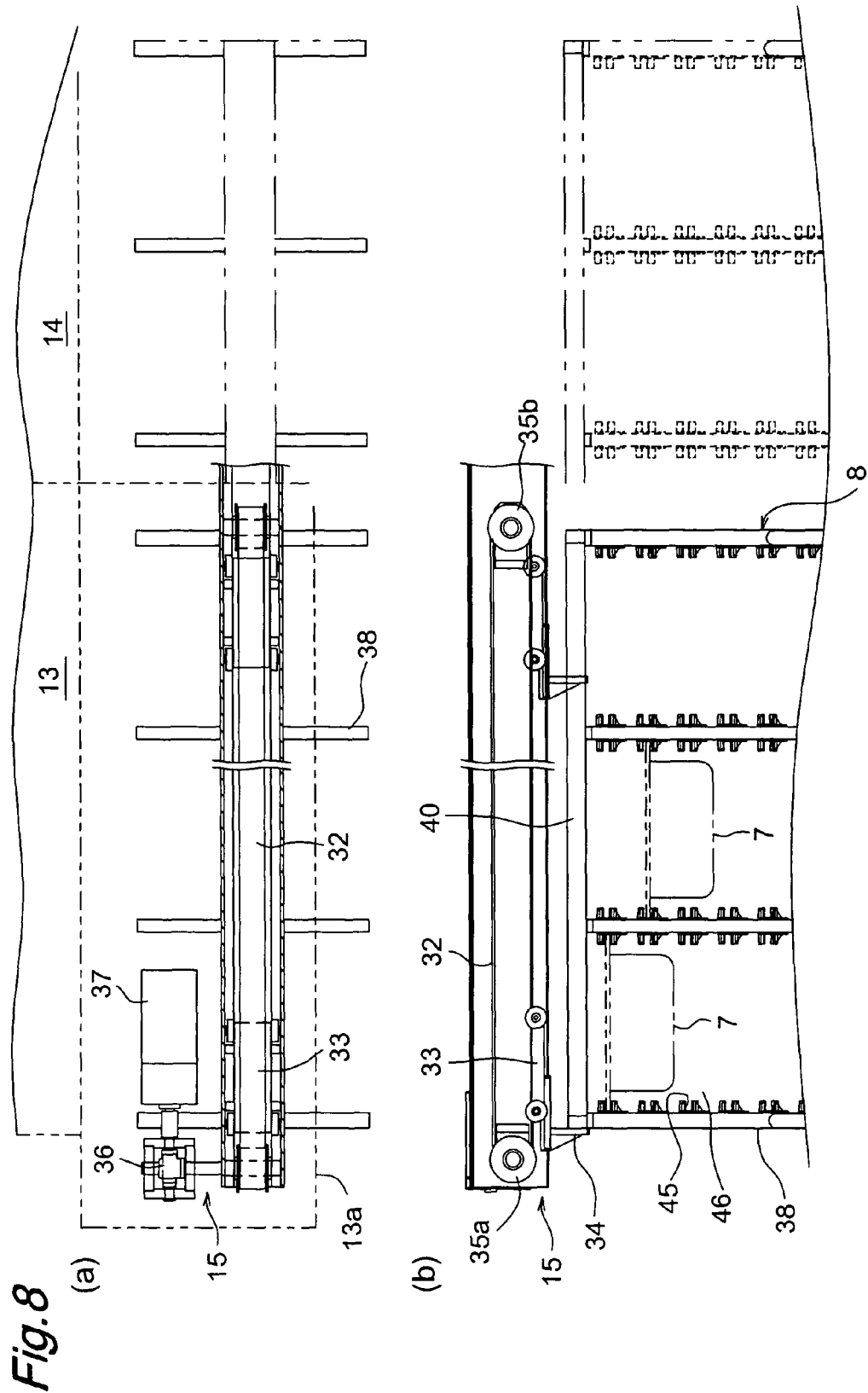
FIG. 8($a$) is a plan view of FIG. 7 and FIG. 8($b$) is a front sectional view showing a part of FIG. 8($a$)

The cart transfer member 15, as shown in FIG. 8, comprises a drive belt 32 provided on the upper portion of the cart standby portion 13 and the tray supply portion 14, a slider 33 fixed on the drive belt and a pusher 34 extending downward from the slider 33. The belt 32 is engaged with pulleys 35a, 35b provided on both sides. A drive power is transferred to one pulley 35a via a pair of gears 36 from the shaft of the transfer motor 37. The pusher 34 is arranged to push the one end surface of the empty cart 8 disposed in the cart standby portion 13 to transfer it to the tray supply portion 14.

Figure 12:
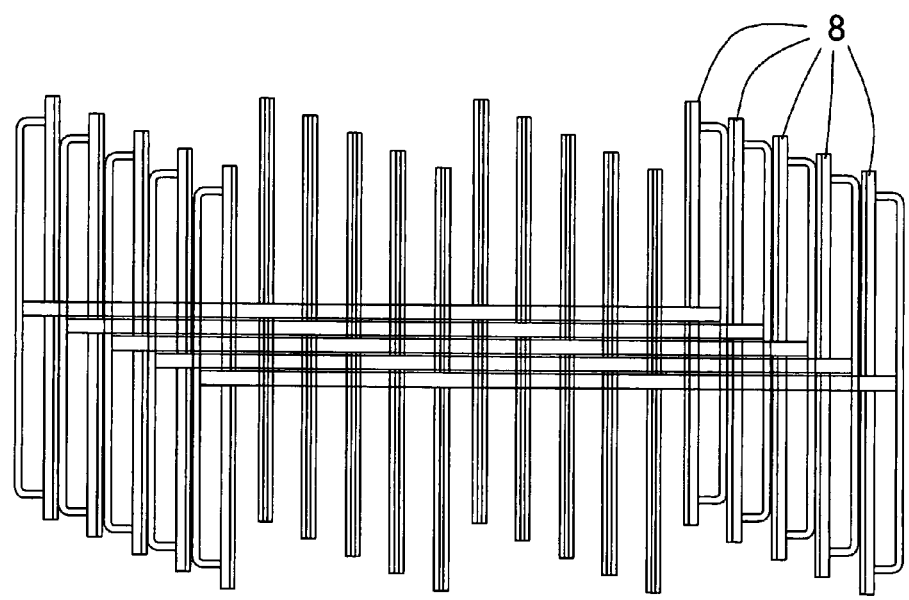
FIG. 12 is a plan view showing a state in which a plurality of carts is put together.

The cart 8, as shown in FIG. 3, is an integrated construction comprising four support panels 38 kept upright at predetermined intervals, an upper connection member 40 connecting each middle portion of upper ends of the support panels and a lower connection member 41 connecting each leg portion 39 protruded from the middle portions of lower ends of the support panels. In the support panels 38 that are positioned at both sides, grips 42 are provided respectively at the upper side edge portions and also casters 44 are provided respectively at both ends of a support portion 43 extended from the lower end of the leg portions 39. Thus, holding the grips 42 allows the cart 8 to freely move. On the opposite surfaces of the support panels 38, guide grooves 45 are formed at predetermined intervals in a vertical direction. The opposite guide grooves 45 constitute storage shelves 46 for supporting the flange portions 11 of the trays 7. In the case that no tray 7 is stored in the storage shelf 46, it is possible to bring the carts 8 together as shown in FIG. 12 to reduce the non-use storage space. A reflection plate 47 (see FIG. 7) made of metal is provided on the middle portion of the lower surface of the lower connection member 41 so that the reflection plate 47 can be detected by a position displacement detection sensor 59 that will be described herein after.

The tray transfer line 3 is so constructed that a plurality of rollers (not shown) is driven to rotate and convey the tray 7 downstream, i.e., to the tray discharge apparatus 2.

The medicine dispensing apparatus 4 is so constructed that medicines are packed by one dose based on a prescription data inputted from a server 78 or the like and dispensed to the tray 7 that is conveyed on the tray transfer line 3. On the lower portion of the medicine dispensing apparatus 4, a stopper (not shown) is provided to stop the tray 7 moving along the tray transfer line 3 if required.

The card rewriting apparatus 5 is so constructed that predetermined matter can be printed on the identification card 12 provided on the tray 7 and, if already printed, the content can be rewritten and reprinted (in detail, see, for example, Japanese patent Laid-open patent publication 2002-165865).

The stack lifter 6 is so constructed that the trays 7, which have been conveyed with the medicine contained therein, can be stacked to put them on standby and then supplied to the tray discharge apparatus 2 sequentially (in detail, see, for example, Japanese patent Laid-open patent publication 2002-240946).

The cart transfer apparatus 9 comprises a first cart transfer apparatus 9a for transferring the empty carts 8 aligned on the cart supply line 48 and a second cart transfer apparatus 9b for aligning the carts 8 in which the trays 7 are stored at the tray discharge apparatus 2 with the cart discharge line 49 (the lines on which the cart transfer apparatuses 9a, 9b is disposed respectively are shown by two-dots chain line in FIG. 1A).

Each of the cart transfer apparatuses 9a, 9b comprises a drive motor 52 (pulse motor), detection members 53, a control substrate 54, grip members 55 and so on which are provided on a frame 51 supported by four wheels 50. The wheels 50 are attached on the ends portions of the rotation axes rotatably supported by bearing portions 56. A drive power of the drive motor 52 is transmitted to the rotation axes via drive transmission belt 57. As the detection members 53, cart detection sensors 58 on the middle portions of both sides, a position deviation sensor 59, search sensors 60 and a third optical communication sensor 61 are provided.

Each of the cart detection sensors 58 comprises three juxtaposed optical sensors each having a light emitting element and a light receiving element. A light irradiated from the light emitting element is reflected on the lower surface of the lower connection portion 41 of the cart 8 and received by the light receiving element so that the lower connecting portion 41 is detected. All of the sensors are disposed so as to simultaneously detect the lower connecting portion 41.

The position deviation sensor 59 is used to detect the reflection plate 47 provided on the cart 8 and decide whether or not the cart 8 is positioned at the center of the cart supply line 48 or the cart discharge line 49, i.e. whether or not the cart 8 deviates from the center in the direction perpendicular to each line.

As the detection sensor 60, an ultrasonic sensor is used for example. The detection sensors 60 are disposed at a total of four places on both sides of the end portions of the cart transport unit 9, respectively, to detect the cart 8. For example, the detection sensor 60 is used when accessing the cart 8 in order to grip the cart 8 by means of the grip member 55 which will be described herein after, when detecting presence or absence of the cart 8, when transporting the gripped cart 8, when detecting whether or not the cart 8 bumps against the other cart 8 and so on.

The third optical communication portion 61 conducts data transmission and reception with the first optical communication portion or the second optical communication portion 27 provided on the tray discharge unit 2.

The control substrate 54 controls the pulse signal which will be outputted to the drive motor 52 via the signal converter 63 from the pulse driver 62 based on the data received through the third optical communication portion 61.

Figure 6:
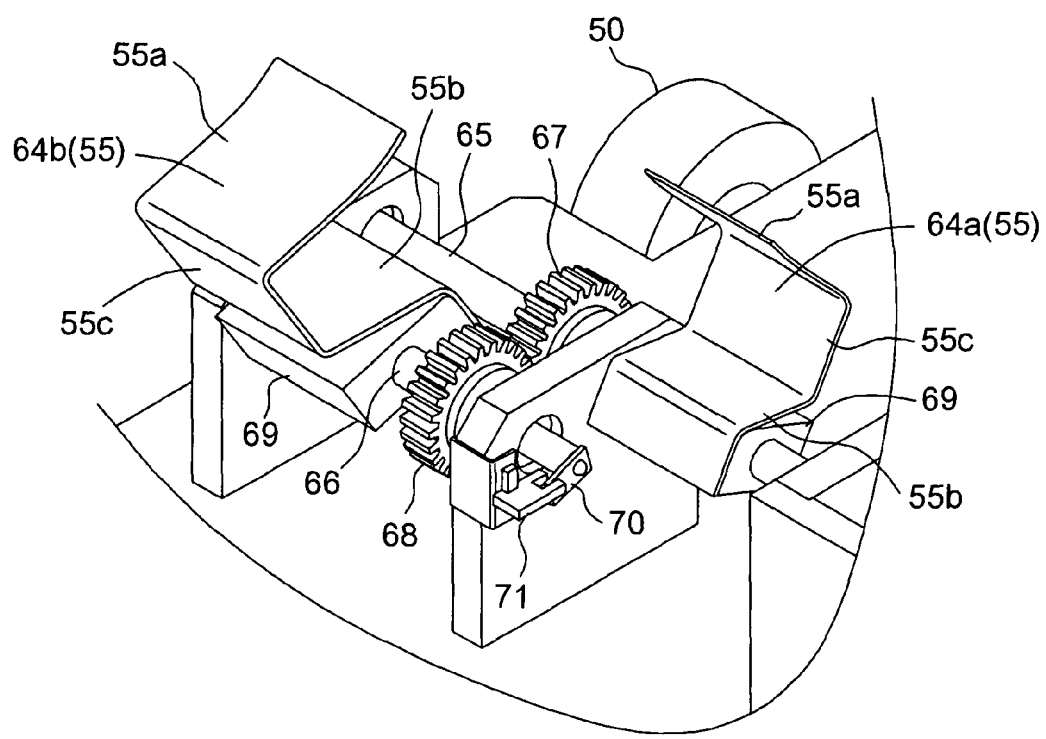
FIG. 6 is an enlarged perspective view showing a grip member provided on the tray transport unit.

Each of the grip members 55, as shown in FIG. 6, comprises a pair of grip arms 64*a*, 64*b*. The grip members 55 are disposed at the center portion of both sides of the frame 51, i.e. in the vicinity of the each of the cart detection sensor 58, respectively. One grip arm 64*a* is fixed on the drive shaft 65 which is rotatable forwardly and reversely due to drive of a motor (not shown). The other grip arm 64*b* is fixed on the driven shaft 66. A drive gear 67 provided on the drive shaft 65 and a driven gear 68 provided on the driven shaft 66 are engaged with each other so that the both grip arms 64*a*, 64*b* rotate synchronously. Each of the grip arms 64*a*, 64*b* is made of metal plate material bent into an upper plate portion 55*a*, a lower plate portion 55*b* and a side plate portion 55*c* for guiding three surfaces (upper, loser and one side surfaces) except the other side surface of the lower connection portion 41 of the cart 8. The upper plate portion 55*a* and the lower plate portion 55*b* are formed so as to expand gradually toward the end from the side plate portion 55*c*, thereby enabling the lower connection portion 41 to be smoothly gripped without interference. Also, the grip arms 64*a*, 64*b* are elastically deformable themselves, enabling the arms to absorb some deviation and surely grip the lower connection portion 41. Each of the grip arms 64*a*, 64*b* are attached on support tables 69 of substantially rectangular parallelepiped shape fixed on each of the shafts. The side plate portion 55*c* of one grip arm 64*a* and that of the other grip arm 64*b* can guide the lower connection portion 41 from the side surfaces. Therefore, even if the cart 8 is skewed in certain degree with respect to the cart transport unit 9, it is possible to correct its position to a proper position. A sensor dog provided on part of the driven shaft 66 is detected by a grip position detection sensor 71, allowing the grip arms to stop their rotation.

Figure 5:
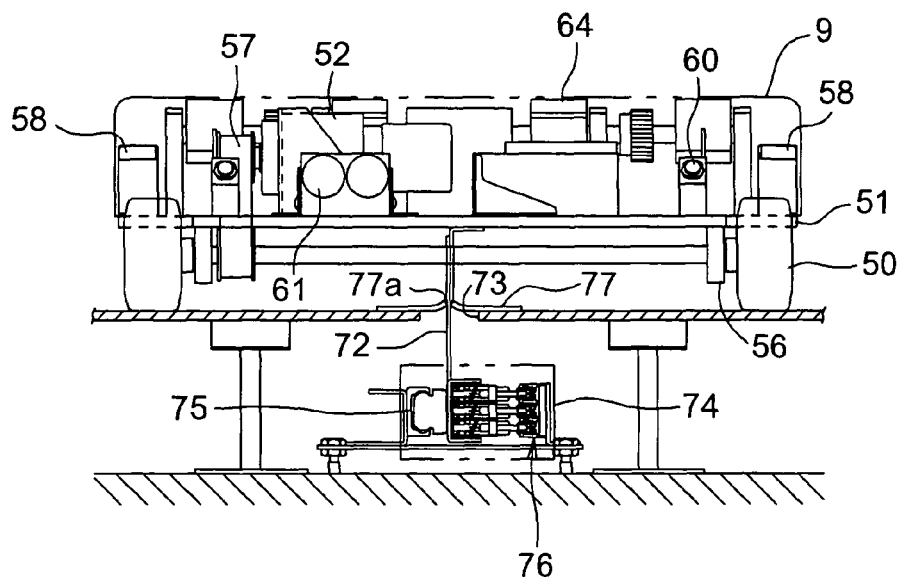
FIG. 5 is a front view showing an internal structure of the tray transport unit and floor.

In the frame 51 of the cart transport unit 9, as shown in FIG. 5, a current collecting arm 72 is provided so as to extend downwardly from the bottom. The current collecting arm 72 serves as a power supply path for supplying power to the motor and so on.

On the floor constituting the cart supply line 48 and the cart discharge line 49, as shown in FIG. 5, a slit 73 is formed. A power supply unit 74 is provided beneath the slit 71. In power supply unit 74, a guide rail 75 and a trolley 76 for power supply are disposed so as to oppose each other. The guide rail 75 can guide the current collecting arm 72 and move the cart transport unit 9 along the line. The trolley 76 supplies power to the cart transport unit 9 via the current collecting arm 72.

The upper opening portion of the slit 73 is covered by a cover 77 made of flexible material. A slit 77*a* is formed in the cover 77, and the current collecting arm 72 is movable in the slit 77*a*.

The control unit 10, as shown in FIG. 11, controls the medicine dispensing unit 4, each roller of the tray transport line 3, the tray discharge unit 2 and so on based on prescription data received from a server 78 and so on or inputted by an input unit (for example, keyboard, mouse, touch panel and so on).

Next, operation of the medicine supply system having the above construction will be described.

First of all, the empty carts 8 are disposed and aligned on the cart supply line 48. That is to say, each of the carts 8 is disposed so that the lower connection portion 41 is orthogonal to the cart supply line 48 and both sides of the lower connection portion 41 is substantially equalized with respect to the cart supply line 48. This arrangement may not be so accurate.

Figure 14:
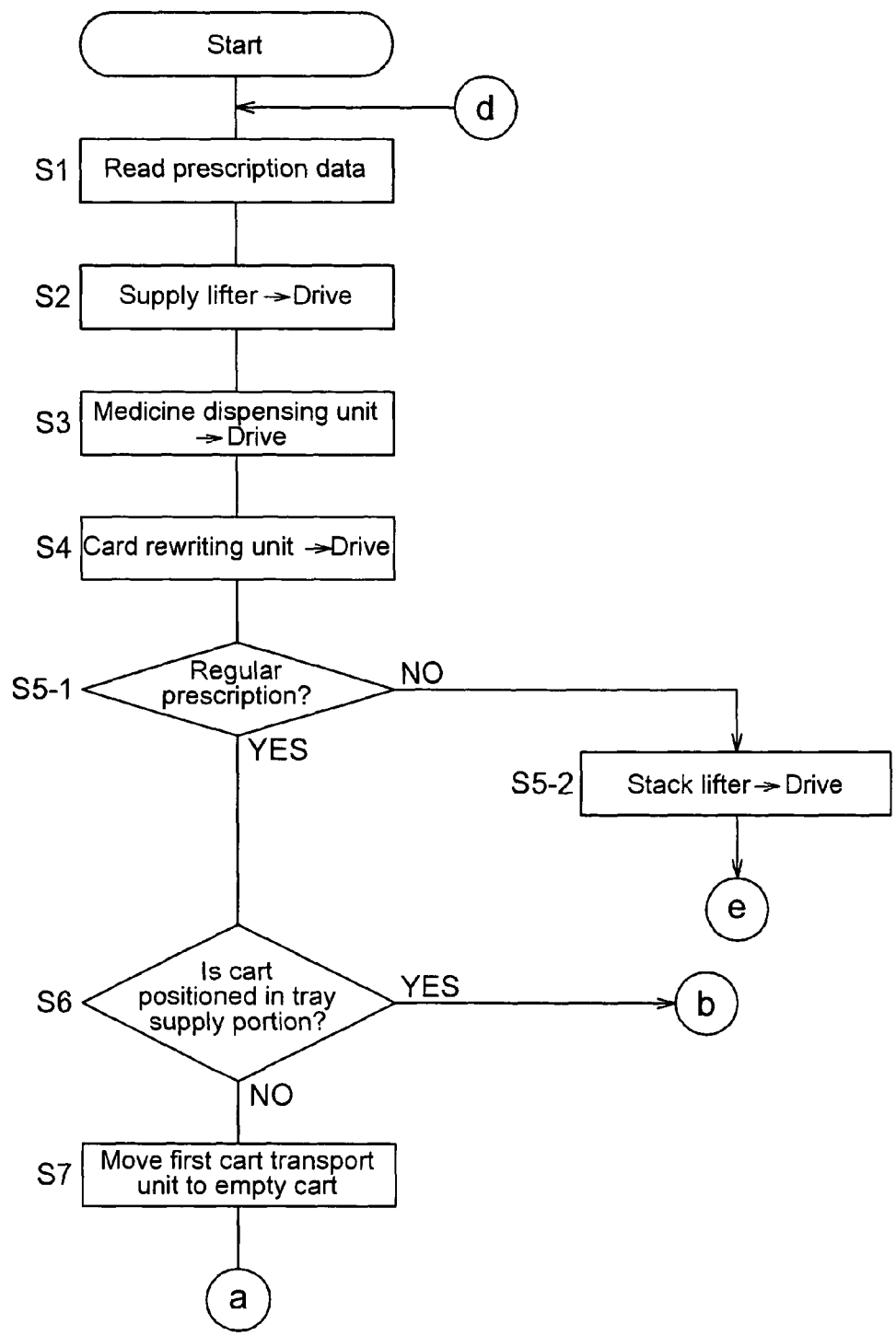
FIG. 14 is a flow chart showing processes in the medicine supply system according to the present invention.
Figure 15:
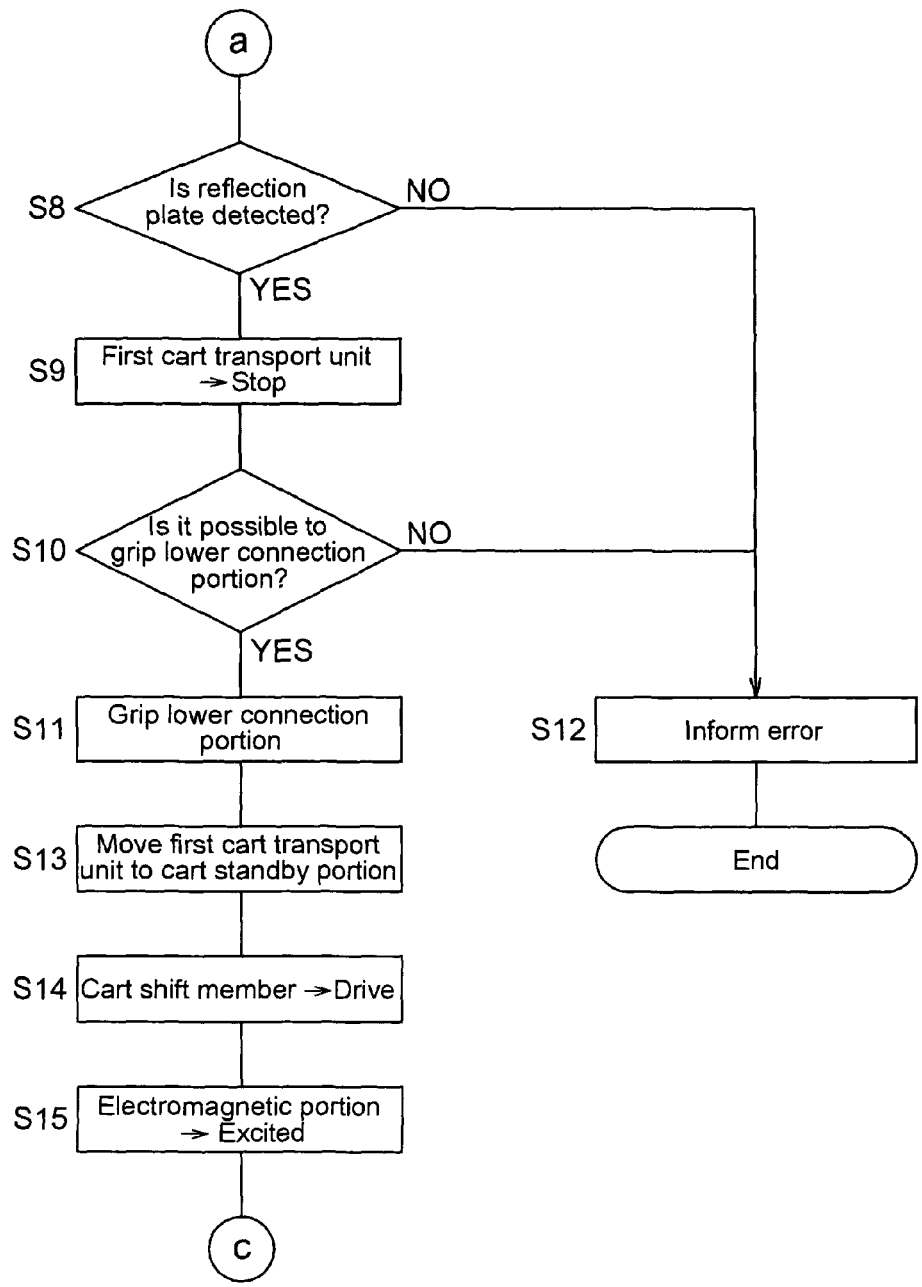
FIG. 15 is a flow chart continued from FIG. 14.
Figure 16:
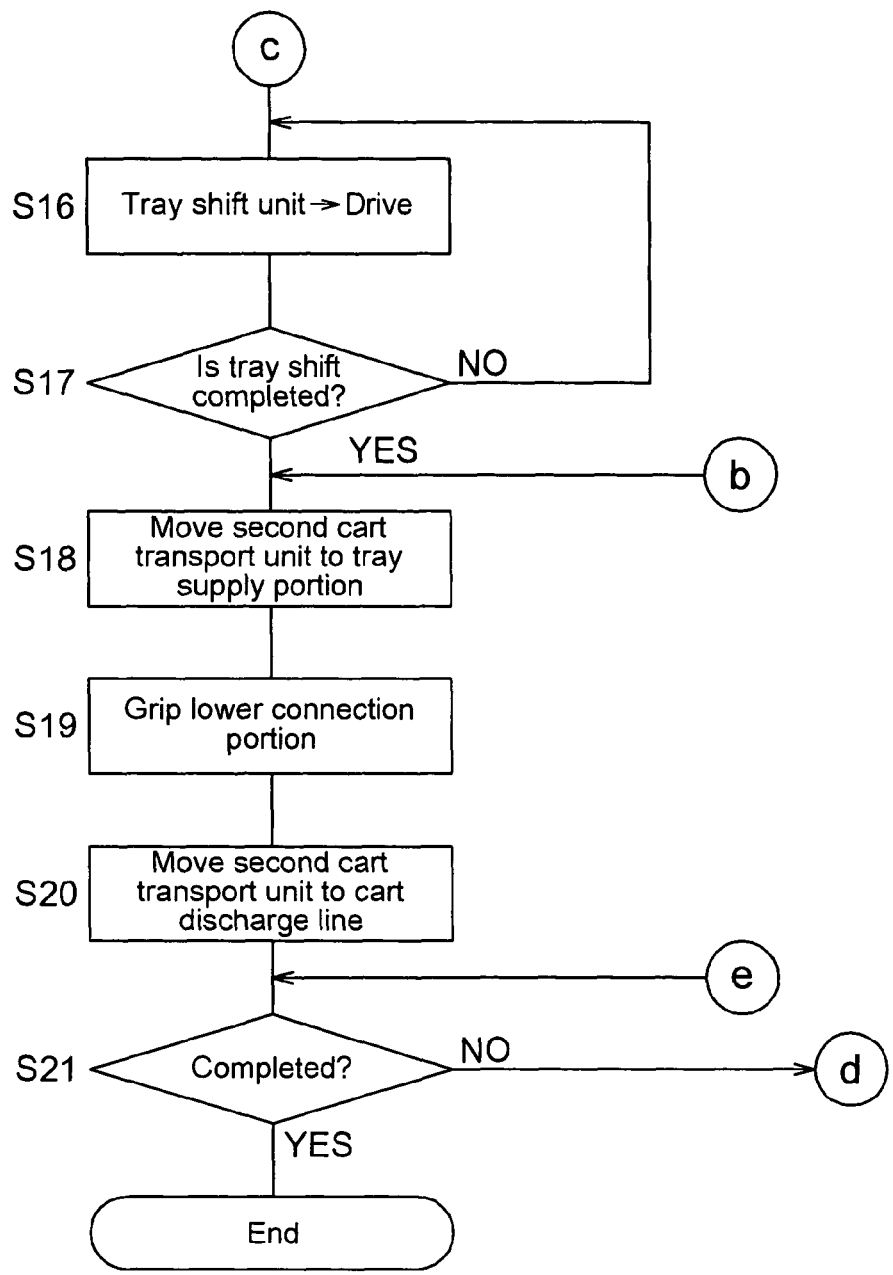
FIG. 16 is a flow chart continued from FIG. 15.

As shown in the flowcharts in FIGS. 14 to 16, based on the prescription data inputted from the server 8 and so on (Step S1), the control unit 10 drives the supply lifter 1 (Step S2) to supply the trays 7 to the tray transport line 3.

Figure 17:
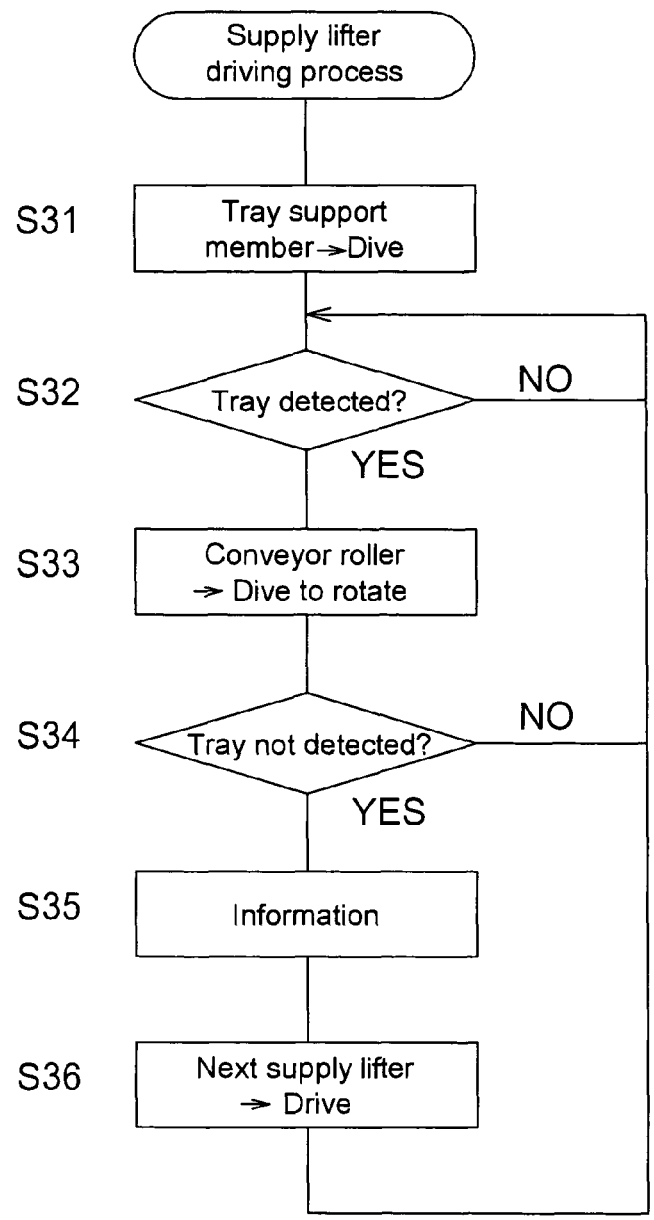
FIG. 17 is a flow chart showing supply lifter driving process.

In the driving process of the supply lifter 1 at Step S2, as shown in a flowchart of FIG. 17, the tray support member 101 of the supply lifter 1 (first supply lifter 1*a*) positioned on the most upstream side of the transport line among the five tray supply lifters 1 is driven (Step S31). That is to say, as shown in FIG. 1F(*a*), the tray support member 101 is moved up to support the stacked trays 7. The carrier pushing member 103 is driven to take out the carrier 123. As shown in FIG. 1F(*b*), the tray support member 101 is driven to move down the stacked tray 7 and position the lowermost tray 7 on the first transport portion 109. Here, as shown in FIG. 1F(*c*), the tray support condition by the tray support member 101 is changed from the lowermost tray 7 to the next upper tray 7. Then, as shown in FIG. 1F(*d*), the other trays 7 are moved without the lowermost tray 7. If it is detected by the first tray detection sensor 121 that the tray 7 is moved down (Step S32: YES), the conveyor rollers 113 are driven to rotate (Step S33). Thus, the tray 7 is transported on the tray transport line 3.

Figure 1H:
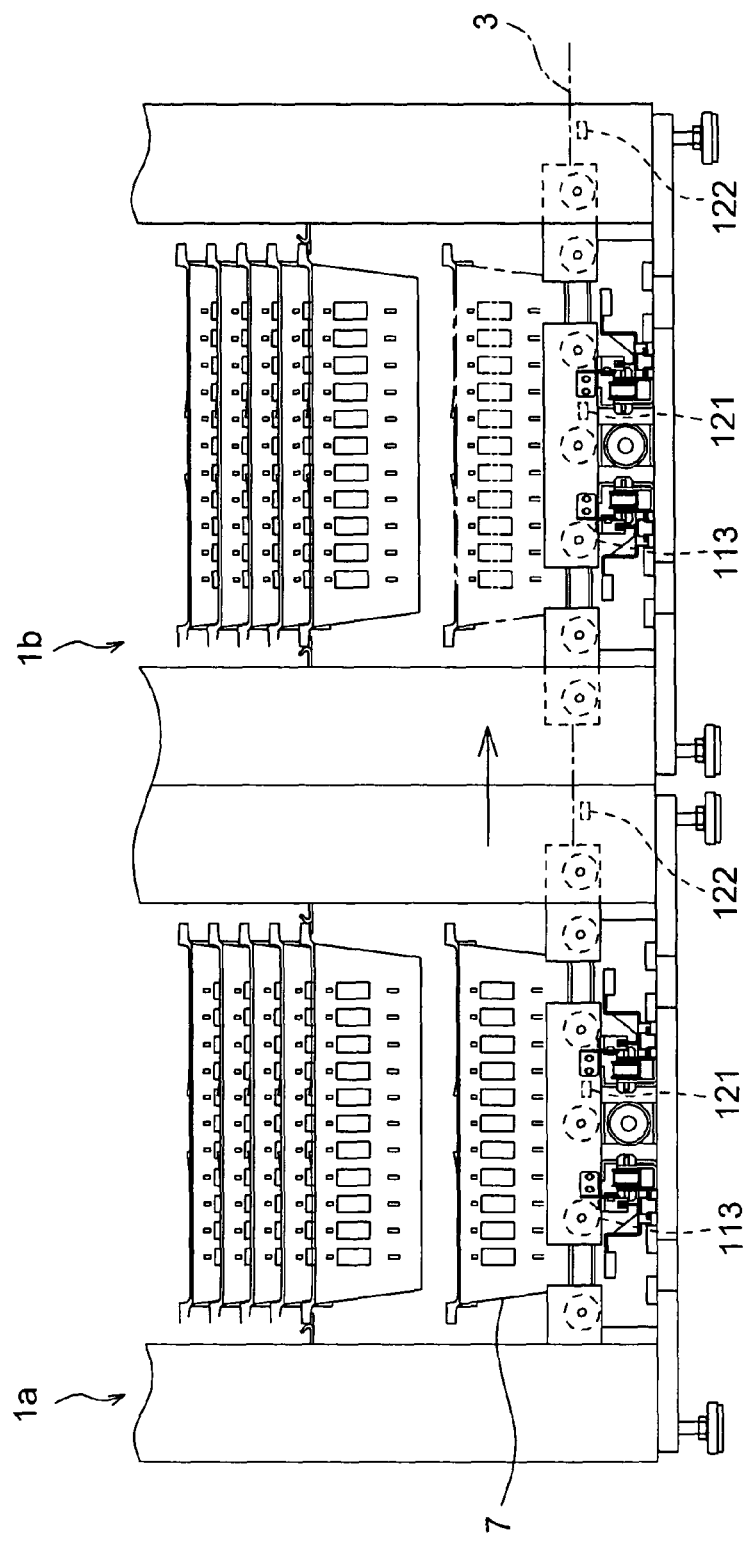
FIG. 1H is a partial front view showing a tray transport state in a supply lifter.

The transport state of the tray 7 in the supply lifter 1 is detected by the first tray detections sensor 121 and the second tray detection sensor 122. As shown in FIG. 1H, when the first tray detection sensor 121 of the upstream side supply lifter 1*a* detects the tray 7, the conveyor roller 113 is driven so that the tray 7 is transported toward the downstream side supply lifter 1*b* on the tray transport line 3. When the first tray detection sensor 121 of the downstream supply lifter 1*b* detects the tray 7 supplied from the upstream side supply lifter 1*a*, the tray supply operation of the supply lifter 1*b* is put on standby and the conveyor rollers 113 are driven to transport the tray 7 further toward the downstream side on the tray transport line 3. If the second tray detection sensor 122 detects the tray 7 for more than a predetermined time, the conveyor rollers 113 are stopped and the tray supply operation of the supply lifter is terminated. Thus, it is possible to correct the position of the tray which is caught and stopped on the tray transport line 3 and place it in a transportable state. Hereinafter, in the same manner, the tray is supplied to the tray transport line 3 in the order of the lowermost one.

After that, When the tray 7 is not detected by the first tray detection sensor 121 even if the first supply lifter 1*a* is driven (Step S34; NO), it is decided and informed that there is a tray 7 shortage in the first supply lifter 1*a* (Step S35). In the supply lifter 1 (second supply lifter 1*b*) adjacent to the first supply lifter 1*a*, the tray support member 101 is driven (Step S36) to commence supplying the trays 7 to the tray transport line 3 in the same manner.

Figure 18:
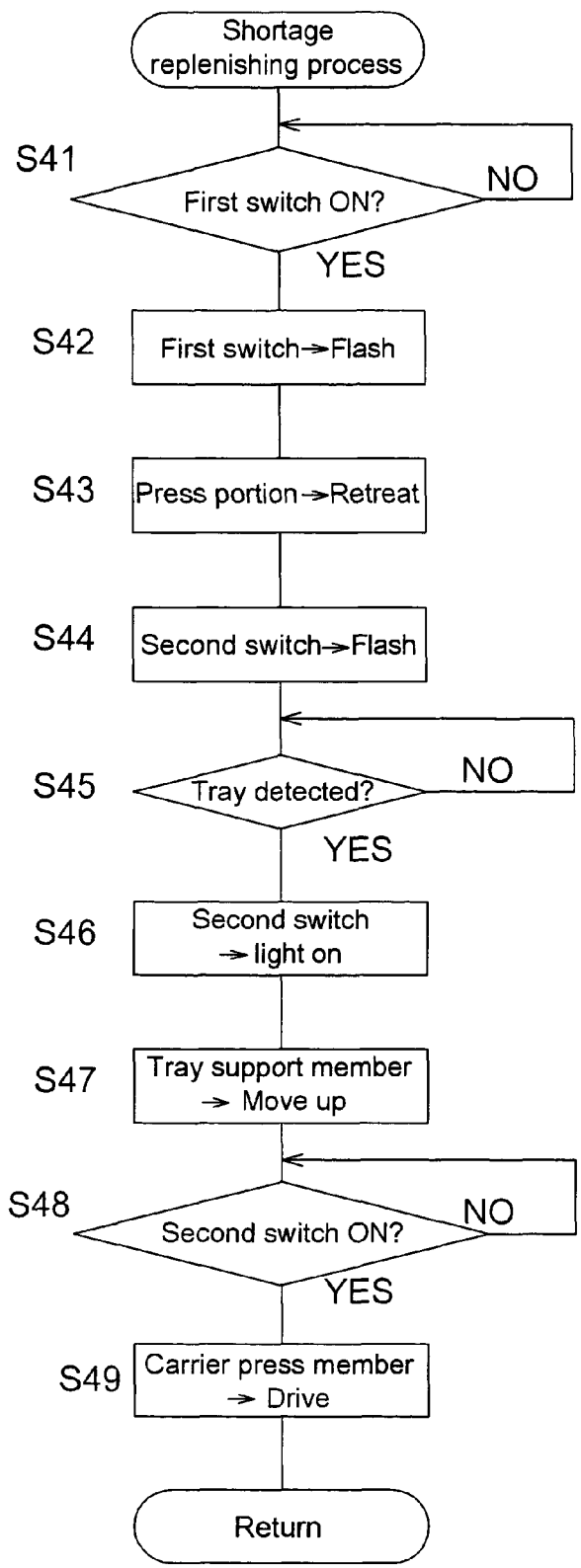
FIG. 18 is a flowchart showing a shortage replenishing process.

Here, a shortage replenishing process for replenishing the trays 7 on the supply lifter 1*a* will be explained in accordance with the flowchart of FIG. 18. The first switch 104 is depressed first. When the first switch 104 is ON (Step S41), the LED is changed to the flashing state from the lighting state (Step S42). Then, the carrier pushing member 103 is driven to retreat the press portion 118 to the back surface side of the cabinet 100 (Step S43). Thus, it is possible for the leg portions 125 of the carrier 123 to enter the cut out portions 111. At this time, the LED of the second switch 105 is put into the flashing state (Step S44) to inform that it is an insertion waiting state of the carrier 123.

When the trays 7 are mounted on the carrier 123 in a stacked state and the carrier 123 is push into the cabinet 100, this is detected by a sensor (not shown) (Step S45). Then, the second switch 105 is put into a lighting state (Step S46) to inform that the stacked trays 7 are set in a proper position. In addition, as shown in FIG. 1F(*a*), the flange of the lowermost tray is supported to move up (Step S47). Here, the second switch 105 is depressed (Step S48), the carrier pushing member 103 is driven (Step S49), allowing the press portions 118 to push the leg portions 125 of the carrier 125 and discharge the carrier 123 to the outside from the inside of the cabinet 100.

Thus, it is possible for the downstream side supply lifter 1*b* to continue supplying the trays 7 even during the work of replenishing the trays 7 into the supply lifter 1*a*, thereby preventing the transportation of trays 7 from being disrupted. Also, after the trays 7 are set in the cabinet 100, the press portions 118 remains at a position where the press portions 118 push out the leg portions 125, thereby preventing the carrier from entering. Thus, it is possible to eliminate the trouble that the carrier 123 is set by mistake during the transportation of the trays 7 on the tray transport line 3.

Reverting to the flowchart of FIG. 14, in the tray transport line 3, rollers (not shown) are driven to transport the supplied trays 7 to the medicine dispensing unit 4. When the tray 7 is moved to the medicine dispensing unit 4 which is able to dispense the medicine indicated in the prescription data, the tray is stopped by a stopper (not shown), causing the medicine concerned to be discharged. If all of the medicines cannot be dispensed by one medicine dispensing unit 4, the tray 7 is also stopped at another medicine dispensing unit 4 to allow the medicine to be dispensed.

If the medicine is completely dispensed, patient data such as patient name and so on, medicine data such as prescribed medicine name and so on, and address data such as ward name and so on are printed on the identification card 12 attached on the tray 7 by the card rewriting unit 5 (Step S4). If anything is printed, it is rewritten. When printing of the identification card 12 is completed, it is decided whether or not the medicine contained in the tray 7 is a regular prescription (Step S5-1). If it is a regular prescription, the processing is shifted to the next step. If it is decided that the medicine is not a regular prescription but a temporary prescription, the tray 7 is stacked in the stack lifter 6 so as to be able to be removed (step 35-2). Thus, even in the case of an urgent prescription for a patient whose condition is rapidly changing, it is possible to put the tray on standby in the stack lifter 6 without storing the tray in the cart 8 to promptly cope with the urgency.

In the tray discharge unit 2, the second optical communication portion 27 of the tray supply portion 14 communicates with the third optical communication portion 61 of the second cart transport unit 9*b*. It is decided based on the detection result of the detection sensor 60 of the second cart transport unit 9*b* whether or not the cart 8 is positioned at the tray supply portion 14 (Step S6). If the cart 8 is not positioned at the tray supply portion 14, the first optical communication portion 16 of the cart standby portion 13 communicates with the third optical communication portion 61 of the first cart transport unit 9*a* and the first cart transport unit 9*a* is moved to the empty cart 8 most closely positioned relative to the tray discharge unit 2 based on the detection result of the detection sensor 60 of the first cart transport unit 9*a* (Step S7). If positioned at the tray supply portion 14, the processing is shifted to Step S18 which will be described herein after.

In this case, the first cart transport unit 9*a* is moved at a high speed until it is decided by the detection sensor 60 positioned at the side of the moving direction of the first cart transport unit 9*a* that the first cart transport unit 9*a* approaches the cart 8 by a distance. When it is decided that the first cart transport unit 9*a* approaches the cart 8 by a distance, the speed is reduced. In detail, the first cart transport unit 9*a* is moved at the high speed (constant speed) until the distance to the cart 8 becomes a first set distance; and if the distance reached the first set distance, the moving speed of the first cart transport unit 9*a* is decelerated by one-fourth. When the distance to the cart 8 becomes a second set distance, which is smaller than the first set distance, the moving speed is further decelerated by one-sixth with respect to the moving speed at the high speed.

When a predetermined time has passed while the position deviation detection sensor 59 does not detect the reflection plate 47 (Step S8; NO), it is decided that the position of the cart 8 is deviated in the direction perpendicular to the cart supply line 48 and an error is informed (Step S12).

When the position deviation detection sensor 59 detects the reflection plate 47 (Step S8; YES), the first cart transport unit 9*a* is stopped (Step S9). Then, it is decided based on the detection signal of the cart detection sensor 58 whether or not the gripping operation of the grip members 55 is possible (Step S10). This decision is conducted in accordance with at least two optical sensors of each cart detection sensor 58 positioned at both sides of the cart transport unit 9*a*.

If it is decided that gripping operation of the grip members 55 is possible (Step S10; YES), the motor (not shown) is driven to rotate the grip arms 64*a*, 64*b* to grip the lower connection portion 41 (Step S11). At this time, the lower connection portion 41 is guided as both side surfaces are pushed by the side plate portions 55*c* of each of the grip arms 64*a*, 64*b*, allowing the cart to be corrected even if the cart is positioned so that the lower connection portion 41 is skewed to a certain degree with respect to the direction perpendicular to the cart supply line 48.

If it is decided that gripping operation of the grip members 55 is impossible, that is to say, the skewed angle of the lower connection portion 41 with respect to the direction perpendicular to the cart supply line 48 is too large for the grip arms 64*a*, 64*b* to grip the lower connection portion 41 (Step S10; NO), an error is informed (Step S12).

If the lower connection portion 41 is held by the grip arms 64*a*, 69*b*, the first cart transport unit 9*a* is moved to the cart standby portion 13 of the tray discharge unit 2 (Step S13). Even when moving to the cart standby portion 13, the first cart transport unit 9*a* is moved at high speed until the unit approaches a certain distance; and if the unit has approach a certain distance 1, the unit is stopped or the speed is decreased. In detail, the first cart transport unit 9*a* is moved at the high speed until the distance to the cart standby portion 13 becomes a first set distance; the moving speed is decelerated by one-sixth until the distance becomes a second set distance from the first distance; and when the distance becomes the second distance, the unit is stopped. At this time, the pusher 34 of the cart shift member 15 is moved to the end portion of the cart standby portion 13. Also, the guide piece 20 of the guide member 17 is elevated to prepare for moving the cart 8 to the cart standby portion 13. Moving the pusher 34 and elevating the guide piece 20 are conducted provided that the preceding cart 8 is not positioned at the cart standby portion 13. Thus, a failure caused by the carts 8 colliding against each other is prevented.

The first transport unit 9a is further driven to move the empty cart 8 to the cart standby portion 13 based on the detection signal of the detection sensor 60. At this time, the pulse number of the applied voltage to the drive motor 52 is controlled to adjust the distance to a distance calculated based on the detection signal of the detection sensor 60.

When the empty cart 8 is positioned at the cart standby portion 13, the guide piece 20 of the guide member 17 is lowered to prevent the cart 8 from deviating at the time of shifting the cart 8. Also, the gripping state of the grip member 55 is released and the first cart transport unit 9a is retreated from the empty cart 8. It is decided based on the detection result of the detection sensor 60 obtained from communication between the second optical communication portion 27 and the third optical communication portion 61 whether or not the cart 8 is positioned at the tray supply portion 14. If no cart 8 is positioned at the tray supply portion 14, the pusher 34 of the cart shift member 15 is moved so that the empty cart 8 is moved to the tray supply portion 14 from the cart standby portion 13 (Step S14). The empty cart 8 is moved as it is prevented by the guide member 17 (guide piece 20 and guide roller 30) and the guide cover 31 from moving laterally.

When the cart 8 is moved to the tray supply portion 14, the electromagnetic portion 28 is excited to attract and position the cart 8 (Step S15). Then, the tray shift unit 21 is driven to continuously store the trays 7 containing medicine in the storage shelf 46 (Step S16). As the cart 8 is positioned by the electromagnetic portion 28 and guided by the guide roller 30, the cart is never displaced during the work of storing the trays 7.

The position of the storage shelf 46 in which the trays 7 are stored can be set, for example, as shown in FIGS. 13(a) to 13(c).

FIG. 13 (a) shows an example in which the trays 7 are stored from 1st to 12th in order of the receipt number of the prescription data accepted by the server 78. FIG. 13 (b) shows an example in which the storage stages are different by the hospital wards. The trays A-1 to A-5 for the hospital ward A are stored in the first and second stages; the trays B-1 and B-2 for the hospital ward B are stored in the third stage; and the trays C-1 to C-3 for the hospital ward C are stored in the fourth stage. FIG. 13(c) shows an example in which storage rows are different by the hospital wards. In this case, differentiating the colors of trays 7 by the hospital wards is preferable in that the operator can easily discriminate them. In the case of cart 8 as shown in FIG. 8, as the guide grooves 45 are provided with a half pitch with respect to the storage space of the tray 7, it is possible to store the trays 7 in the stages shifted by a half pitch, allowing the trays to be discriminated by the hospital wards. If the number of guide grooves 45 is increased, it is possible to provide the trays 7 with various pitches such as one-third pitch with respect to the storage space of the tray 7.

When storage work of the trays 7 into the cart 8 is completed (Step S17: YES), the second cart transport unit 9b is driven through the second optical communication portion 27 of the tray supply portion 14 and the third communication portion 61 of the second cart transport unit 9b to move the cart 8 to the tray supply portion 14 (Step S18). For example, in the storage pattern of FIG. 13 (b), if the delivery address (ward) data of the next tray is different from that of the previous tray, the control unit 10 stores the tray in the storage shelf of the next stage. If no next stage is present, a tray storage completion signal is transmitted to the third optical communication portion 61 of the second transport unit 9b via the second optical communication portion of the tray supply portion 14. When the second communication portion 61 receives the tray storage completion signal, the second tray transport unit 9b moves the cart 8 to the tray supply portion 14. Then, the lower connection portion 41 of the cart 8 positioned at the tray supply portion 14 is gripped by the grip arm 64 of the grip member 55 (Step S19). Subsequently, the electromagnetic portion 28 is demagnetized to release the attracted state of the cart 8. After that, the guide roller 30 is elevated to allow the cart 8 to move to the cart discharge line 49. Then, the second cart transport unit 9b is driven to move the cart to a predetermined position on the cart discharge line 49 (Step S20).

In a similar way, the empty cart 8 of the cart supply line 48 is transported to the tray discharge unit 2 by the cart transport unit 9. After the trays 7 are stored, the cart 8 is moved to the cart discharge line 49. In the cart discharge line 49, the carts 8 may be disposed at even intervals, though it is possible to dispose the carts 8 at different intervals in accordance with the transport address of the carts 8. For example, if there are three carts 8 to be transported to the hospital ward A, these carts are disposed at even intervals. Subsequently, if there are two carts 8 to be transported to the hospital ward B, these carts can be disposed at even intervals and with a large distance to the group of carts 8 to be transported to the hospital ward A. This allows the operator to easily discriminate the carts 8 during transportation to each of the hospital wards, which would be convenient.

Thereafter, with respect to all prescription data inputted in the control unit 10, when the medicine has been dispensed into the trays 7 and the trays 7 containing the medicine are stored in the cart 8 (Step S21: YES), the processing is terminated. If not completed (Step S21: NO), the processing is returned to Step S1 to repeat the same processing.

The above processing is effective in a case where the medicines are contained in the trays 7 and the trays 7 are stored in the cart 8 at night or so.

In the above embodiment, the cart transport unit 9 is provided with the detection sensors 55, though it is also preferable to further provide a vibration sensor. Even if the detection sensors 55 are not able to detect obstacles, the vibration sensor detects vibration generated when the cart transport unit 9 collides with the obstacle. Based on the vibration, an error is informed and the cart transport unit 9 is stopped. This more reliably prevents any trouble that would be caused during movement of the cart transport unit 9.

The invention claimed is:

1. A medicine tray supply apparatus for supplying medicine trays to a tray transport line, the medicine tray supply apparatus comprising:
   a medicine tray storage member capable of storing the medicine trays in a stacked condition; and
   a carrier on which the medicine trays are supported in a stacked state,
   the medicine tray storage member including:
   a tray support member for supporting the medicine trays;
   a tray transport member having a transport mechanism for transporting the medicine trays, the tray transport member constituting a part of the tray transport line, the tray transport member being positioned at substantially the same level as leg portions of the carrier; and a control portion for allowing the tray support member to move down to put the stacked medicine trays on the tray transport member, allowing the tray support member to support and move up the next medicine trays positioned above the lowermost one, and allowing the tray transport member to supply one of the medicine trays situated at the lowermost position to the tray transport line, wherein the tray transport member includes cut out portions in which the leg portions of the carrier are movable, thereby permitting the leg portions to be moved in a direction substantially perpendicular to a medicine tray transporting direction, wherein the tray transport member comprises a first transport portion and second transport portions positioned on opposite sides of the first transport portion, a first one of the cutouts being defined between the first transport portion and a first one of the second transport portions, and a second of the cutouts being defined between the first transport portion and a second one of the second transport portions.

2. The medicine tray supply apparatus as in claim 1, wherein the tray transport member is provided with a carrier pushing member for moving the carrier from the state positioned in the medicine tray storage member to the outside of the medicine tray storage member.

3. The medicine tray supply apparatus as in claim 1, wherein the control unit allows the carrier pushing member to maintain a state in which the carrier is prevented from entering the medicine tray storage member.

4. The medicine tray supply apparatus as in claim 1, wherein the medicine tray storage member comprises a plurality of medicine tray storage members juxtaposed to each other, each of the medicine tray storage members is provided with a tray detection portion for detecting whether or not one of the medicine trays conveyed by the tray transport member is present; and wherein the control portion allows the medicine tray storage member positioned at the upstream side among the plurality of medicine tray storage members to supply the medicine trays and if it is decided that the medicine trays have become depleted based on the detection signal of the tray detection portion, the control portion allows the next medicine tray storage member, positioned at the downstream side of the medicine tray storage member positioned at the upstream side, to commence supplying the medicine trays.

5. The medicine tray supply apparatus as in claim 1, wherein the control unit allows the carrier pushing member to maintain a state in which the carrier is prevented from entering the medicine tray storage member.

6. The medicine tray supply apparatus as in claim 2, wherein the medicine tray storage member comprises a plurality of medicine tray storage members juxtaposed to each other, each of the medicine tray storage members is provided with a tray detection portion for detecting whether or not one of the medicine trays conveyed by the tray transport member is present; and wherein the control portion allows the medicine tray storage member positioned at the upstream side of the plurality of medicine tray storage members to supply the medicine trays and if it is decided that the medicine trays have become depleted based on the detection signal of the tray detection portion, the control portion allows the next medicine tray storage member, positioned at the downstream side of the medicine tray storage member positioned at the upstream side, to commence supplying the medicine trays.

7. The medicine tray supply apparatus as in claim 3, wherein the medicine tray storage member comprises a plurality of medicine tray storage members juxtaposed to each other, each of the medicine tray storage members is provided with a tray detection portion for detecting whether or not one of the medicine trays conveyed by the tray transport member is present; and wherein the control portion allows the medicine tray storage member positioned at the upstream side of the plurality of medicine tray storage members to supply the medicine trays and if it is decided that the medicine trays have become depleted based on the detection signal of the tray detection portion, the control portion allows the next medicine tray storage member, positioned at the downstream side of the medicine tray storage member positioned at the upstream side, to commence supplying the medicine trays.

* * * * *

UNITED STATES PATENT AND TRADEMARK OFFICE
CERTIFICATE OF CORRECTION

| | |
|---|---|
| PATENT NO. | : 7,731,473 B2 |
| APPLICATION NO. | : 11/587556 |
| DATED | : June 8, 2010 |
| INVENTOR(S) | : Shoji Yuyama et al. |

It is certified that error appears in the above-identified patent and that said Letters Patent is hereby corrected as shown below:

On the Title Page

Item (56) References Cited, under the "FOREIGN PATENT DOCUMENTS" heading, please delete the following reference:

"DE    1 478 857    1/1970"

In column 11, line 59, "(step 35-2)" should read --(step S5-2)--.

Signed and Sealed this

Sixteenth Day of November, 2010

David J. Kappos
*Director of the United States Patent and Trademark Office*